United States Patent
Yang et al.

(10) Patent No.: US 11,667,755 B2
(45) Date of Patent: Jun. 6, 2023

(54) SILOXANE HYBRID MEMBRANES FOR ENHANCED NATURAL GAS LIQUID RECOVERY

(71) Applicant: Saudi Arabian Oil Company, Dhahran (SA)

(72) Inventors: Junyan Yang, Acton, MA (US); Benjamin James Sundell, Arlington, MA (US)

(73) Assignee: Saudi Arabian Oil Company, Dhahran (SA)

( * ) Notice: Subject to any disclaimer, the term of this patent is extended or adjusted under 35 U.S.C. 154(b) by 230 days.

(21) Appl. No.: 17/140,378

(22) Filed: Jan. 4, 2021

(65) Prior Publication Data

US 2022/0213271 A1  Jul. 7, 2022

(51) Int. Cl.
*C08G 77/04* (2006.01)
*B01D 53/22* (2006.01)
*B01D 67/00* (2006.01)
*B01D 69/10* (2006.01)
*B01D 71/70* (2006.01)

(52) U.S. Cl.
CPC ......... *C08G 77/045* (2013.01); *B01D 53/228* (2013.01); *B01D 67/0013* (2013.01); *B01D 67/0079* (2013.01); *B01D 69/10* (2013.01); *B01D 71/70* (2013.01); *B01D 2256/245* (2013.01); *B01D 2257/7022* (2013.01); *B01D 2323/12* (2013.01); *B01D 2323/30* (2013.01); *B01D 2323/36* (2013.01); *B01D 2325/34* (2013.01)

(58) Field of Classification Search
None
See application file for complete search history.

(56) References Cited

U.S. PATENT DOCUMENTS

| 7,399,581 | B2 * | 7/2008 | Allen | C08G 77/045 |
| | | | | 430/326 |
| 2008/0134884 | A1 * | 6/2008 | Sammons | B01D 71/70 |
| | | | | 427/244 |
| 2008/0149561 | A1 | 6/2008 | Chu et al. | |
| 2016/0159989 | A1 * | 6/2016 | Kang | B01D 71/70 |
| | | | | 525/102 |
| 2019/0070566 | A1 | 3/2019 | Kidambi et al. | |
| 2020/0153040 | A1 * | 5/2020 | Joo | C08G 77/18 |

FOREIGN PATENT DOCUMENTS

| JP | 2012-187452 | * 10/2012 | ......... B01D 53/228 |
| JP | 2012187452 | 10/2012 | |

OTHER PUBLICATIONS

Isayeva, Irada S. et al., "Amphiphilic Membranes Crosslinked and Reinforced by POSS", Journal of Polymer Science Part A: Polymer Chemistry, 42, 17, Sep. 2004, pp. 4337-4352. (Year: 2004).*

(Continued)

*Primary Examiner* — Jason M Greene
(74) *Attorney, Agent, or Firm* — Fish & Richardson P.C.

(57) ABSTRACT

This disclosure relates to functionalized polyhedral oligomeric silsesquioxanes (POSS) and polymeric membranes containing the functionalized POSS. This disclosure also relates to methods of using the membranes for natural gas liquid recovery, such as removal and recovery of $C_{3+}$ hydrocarbons from natural gas.

36 Claims, 11 Drawing Sheets

(56) References Cited

OTHER PUBLICATIONS

English language machine translation for JP 2012-187,452. Clarivate Analytics, 2022. (Year: 2022).*

PCT International Search Report and Written Opinion in International Appln. No. PCT/US2022/011186, dated Apr. 22, 2022, 13 pages.

Baumann et al., "Synthesis and characterization of novel PDMS Nanocomposites Using POSS Derivatives as Cross-Linking Filler," Journal of Polymer Science Part A Polymer Chemistry, 47:10, May 2009, 2589-2596, 8 pages.

Belcher et al., "Novel low-temperature POSS-containing siloxane elastomers", NASA Technical Reports, 2008, 11 pages.

Chen et al., "Synergistic effect between POSS and fumed silica on thermal stabilities and mechanical properties of room temperature vulcanized (RTV) silicone rubbers," Polymer Degradation and Stability, 97:3, 2012, 303-315, 8 pages.

Chen et al., "Synthesis and characterization of novel room temperature vulcanized (RTV) silicon rubbers using octa[(trimethoxysilyl)ethyl]-POSS as crosslin-linker," Reactive and Functional Polymers, 71(4):, 2011, 502-511, 11 pages.

Hasik et al., "Polysiloxane-POSS systems as precursors to SiCO ceramics," Reactive and Functional Polymers, 73:5, May 2013, 779-788, 10 pages.

Isayeva et al., "Amphiphilic membranes crosslinked and reinforced by POSS," Journal of Polymer Science Part A: Polymer Chemistry, 42:17, Sep. 2004, 4337-4352, 16 pages.

Liu et al., "Synthesis and application of PDMS/OP-POSS membrane for the pervaporative recovery of n-butyl acetate and ethyl acetate from aqueous media." Journal of Membrane Science 591, Dec. 2019, 16 pages.

Liu et al., "Preparation and thermal degradation behavior of room temperature vulcanized silicone rubber-g-polyhedral oligomeric silsesquioxane," Polymer, 54:22, Oct. 2013, 6140-6149, 10 pages.

Madhavan et al., "Structure-gas transport property relationships of poly (dimethylsiloxane-urethane) nanocomposite membranes," Journal of Membrane Science, 342:1-2, Oct. 2009, 291-299, 9 pages.

Pan et al., "Synthesis and characterization of fillers of controlled structure based on polyhedral oligomeric silsesquioxane cages and their use in reinforcing siloxane elastomers", J. Polym. Sci.: Part B: Polym, Phys., 41:24, 2003, 3314-3323, 10 pages.

Raftopoulos et al., "Segmental dynamics in hybrid polymer/POSS nanomaterials," Progress in Polymer Science, 52:, 2016, 136-187, 52 pages.

Rao et al., "Preparation and oxygen/nitrogen permeability of PDMS crosslinked membrane and PDMS/tetraethoxysilicone hybrid membrane," Journal of Membrane Science, 303:1, 2007, 132-139, 8 pages.

Rezakazemi et al., "Synthesis and gas transport properties of crosslinked poly(dimethylsiloxane) nanocomposite membranes using octatrimethylsiloxy POSS nanoparticles," J. Natural Gas Sci. & Eng., 30, 2016, 10-18, 37 pages.

Yang et al., "Thermal stability enhancement mechanism of poly(dimethylsiloxane) composite by incorporating octavinyl polyhedral oligomeric silsesquioxane," Polymer Degradation and Stability, 98:1, Jan. 2013, 109-114, 6 pages.

Zhan et al., "Enhanced pervaporation performance of PDMS membranes based on nanosized Octa[(trimethoxysilyl)ethyl]-POSS as macro-crosslinker," Applied Surface Science, 473:, Apr. 2019, 785-798, 37 pages.

Zhang et al., "Effect of polyhedral oligomeric silsesquioxane (POSS) on crystallization behaviors of POSS/polydimethylsiloxane rubber nanocomposites," Royal Society of Chemistry, RSC Advances, 4:, 2014, 6275-6283, 9 pages.

* cited by examiner

SILOXANE HYBRID MEMBRANES FOR ENHANCED NATURAL GAS LIQUID RECOVERY

TECHNICAL FIELD

This document relates to dual-functionalized polyhedral oligomeric silsesquioxanes and polymeric membranes containing the dual-functionalized polyhedral oligomeric silsesquioxane. The document also relates to methods of using the membranes for natural gas liquid recovery, such as removal and recovery of $C_{3+}$ hydrocarbons from natural gas.

BACKGROUND

Natural gas plays a significant role in the global energy mix. It is the number three fuel, reflecting 24% of global primary energy, and it is the second energy source in power generation, representing a 22% share. However, raw natural gas contains significant amounts of other gas components, including acid gases ($CO_2$ and $H_2S$), $N_2$, He, water, and heavy hydrocarbons ($C_{3+}$). The separation of $C_{3+}$ hydrocarbons from raw natural gas is necessary to prevent condensation during transportation by reducing the dew point and heating value to pipe line specifications. These $C_{3+}$ hydrocarbons are valuable chemical feedstock and also can be used as a liquid fuel for power generation and seawater desalination. Therefore, it is economically attractive to recover $C_{3+}$ hydrocarbons from natural gas.

$C_{3+}$ hydrocarbons are conventionally separated through cryogenic distillation, pressure swing adsorption, or other energetically intensive refrigeration processes, but polymeric membrane-based separations have emerged as an economically favorable alternative due to reduced capital and energetic cost. Commercially, polydimethylsiloxane (PDMS)-based rubbery siloxane membranes have been applied to separate $C_{3+}$ hydrocarbons from raw natural gas. The high permeability of PDMS allows for simultaneous rejection of $N_2$ and concentration of $C_{3+}$ hydrocarbons in membrane permeate streams. However, conventional PDMS membranes exhibit lower selectivity for $C_{3+}$ than for methane ($C_{3+}/CH_4$) due to swelling under aggressive feed streams and testing conditions.

Therefore, there is a need for efficient polymeric membranes with enhanced separation performance in order to achieve significant $C_{3+}$ hydrocarbons recovery from natural gas while reducing capital and operating expenditures.

SUMMARY

Provided in the present disclosure is a compound of Formula (I):

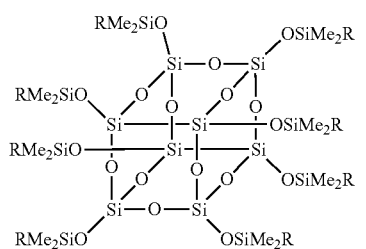

wherein each R is independently selected from H and —($C_2$-$C_{11}$ alkyl)-Si—O—($C_1$-$C_3$ alkyl)$_3$, and wherein the compound of Formula (I) comprises a ratio of H to —($C_2$-$C_{11}$ alkyl)-Si—O—($C_1$-$C_3$ alkyl)$_3$ of 1:3, 1:1, or 3:1.

In some embodiments of the compound of Formula (I), —($C_2$-$C_{11}$ alkyl)-Si—O—($C_1$-$C_3$ alkyl)$_3$ is —($CH_2$)$_2$—Si—O—($CH_3$)$_3$. In some embodiments, the ratio of H to —($CH_2$)$_2$—Si—O—($CH_3$)$_3$ is 3:1. In some embodiments, the compound of Formula (I) is a compound having the structure:

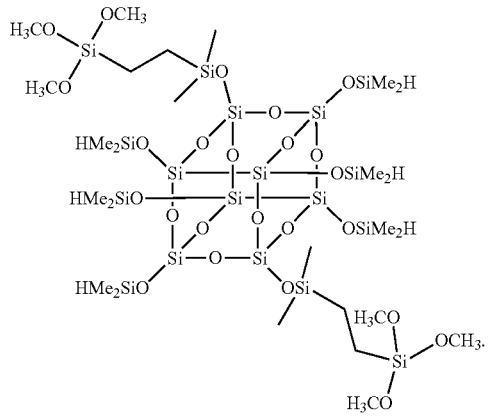

Also provided in the present disclosure is an organic-inorganic hybrid membrane comprising: a compound of Formula (I) of the present disclosure; vinylmethylsiloxane terpolymers; and silanol functional polymer; wherein the compound of Formula (I), the vinylmethylsiloxane terpolymers, and the silanol functional polydimethylsiloxane are crosslinked. In some embodiments, the membrane is cast on a polyacrylonitrile (PAN) support.

In some embodiments of the membrane, the compound of Formula (I) is a compound having the structure:

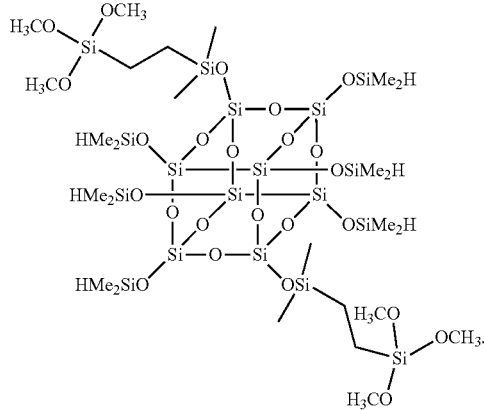

In some embodiments of the membrane, the vinylsiloxane terpolymer is selected from a vinylmethylsiloxane-octylmethylsiloxane-dimethylsiloxane terpolymer and a vinylmethylsiloxane-phenylmethylsiloxane-dimethylsiloxane terpolymer. In some embodiments, the vinylsiloxane terpolymer is a vinylmethylsiloxane-octylmethylsiloxane-dimethylsiloxane terpolymer having a (VinylMeSiO)$_p$(Me$_2$SiO)$_m$(R$_1$MeSiO)$_n$ backbone. In some embodiments, the vinylmethylsiloxane-octylmethylsiloxane-dimethylsiloxane terpolymer contains about 1% to about 5% vinylmethylsiloxane and about 20% to about 40% octylmethylsiloxane. In some embodiments, the vinylsiloxane terpolymer is a vinylmethylsiloxane-phenylmethylsiloxane-dimethylsiloxane terpolymer having a (VinylMeSiO)$_p$(PhMeSiO)$_m$(R$_1$MeSiO)$_n$ backbone. In some embodiments, the vinylmethylsiloxane-phenylmethylsiloxane-dimethylsiloxane terpolymer contains about 1% to about 5% vinylmethylsiloxane and about 20% to about 40% phenylmethylsiloxane. In some embodiments, the vinylsiloxane terpolymer has a molecular weight of about 2,500 Da to about 3,000 Da or about 10,000 Da to about 12,000 Da or about 50,000 Da.

In some embodiments of the membrane, the silanol functional polymer is a silanol functional polydimethylsiloxane. In some embodiments, the silanol functional polymer is a silanol functional polymer having a OH(Me$_2$SiO)$_x$(R$_2$R$_1$SiO)$_y$OH backbone. In some embodiments, the silanol functional polymer is selected from silanol-terminated polydimethylsiloxane, silanol-terminated polydiphenylsiloxane, silanol-terminated diphenylsiloxane-dimethylsiloxane copolymer containing diphenylsiloxane monomers, silanol-terminated polytrifluoropropylmethylsiloxane, and combinations thereof. In some embodiments, the silanol functional polymer has a molecular weight of about 550 Da to about 1,200 Da or about 1,000 Da to about 1,400 Da or about 900 Da to about 50,000 Da or about 400 Da to about 140,000 Da.

In some embodiments, the membrane has a crosslinking density of about $10\times10^5$ mol/mL to about $30\times10^5$ mol/mL.

In some embodiments, the membrane has a $C_3H_8/CH_4$ single gas selectivities ($\alpha C_3H_8/CH_4$) of about 7 to about 25 at feed temperature of 25° C. and feed pressure of 1 bar.

In some embodiments, the membrane has a $C_4H_{10}/CH_4$ single gas selectivities ($\alpha C_4H_{10}/CH_4$) of about 25 to about 100 at feed temperature of 25° C. and feed pressure of 1 bar.

Also provided in the present disclosure is a method of separating $C_{3+}$ hydrocarbons from natural gas, the method comprising: providing an organic-inorganic hybrid membrane comprising: a compound of Formula (I) of the present disclosure; vinylmethylsiloxane terpolymers; and silanol functional polymer; wherein the compound of Formula (I), the vinylmethylsiloxane terpolymers, and the silanol functional polydimethylsiloxane are crosslinked; introducing a natural gas stream to the membrane; and separating the $C_{3+}$ hydrocarbons from the natural gas.

In some embodiments of the method, the compound of Formula (I) is a compound having the structure:

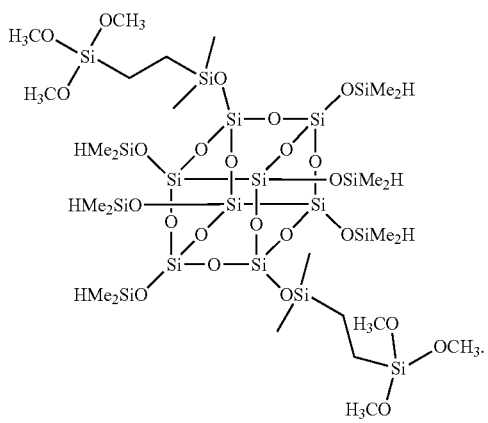

In some embodiments of the method, the vinylsiloxane terpolymer is selected from a vinylmethylsiloxane-octylmethylsiloxane-dimethylsiloxane terpolymer and a vinylmethylsiloxane-phenylmethylsiloxane-dimethylsiloxane terpolymer. In some embodiments, the vinylsiloxane terpolymer is a vinylmethylsiloxane-octylmethylsiloxane-dimethylsiloxane terpolymer having a (VinylMeSiO)$_p$(Me$_2$SiO)$_m$(R$_1$MeSiO)$_n$ backbone. In some embodiments, the vinylmethylsiloxane-octylmethylsiloxane-dimethylsiloxane terpolymer contains about 1% to about 5% vinylmethylsiloxane and about 20% to about 40% octylmethylsiloxane. In some embodiments, the vinylsiloxane terpolymer is a vinylmethylsiloxane-phenylmethylsiloxane-dimethylsiloxane terpolymer having a (VinylMeSiO)$_p$(PhMeSiO)$_m$(R$_1$MeSiO)$_n$ backbone. In some embodiments, the vinylmethylsiloxane-phenylmethylsiloxane-dimethylsiloxane terpolymer contains about 1% to about 5% vinylmethylsiloxane and about 20% to about 40% phenylmethylsiloxane. In some embodiments, the vinylsiloxane terpolymer has a molecular weight of about 2,500 Da to about 3,000 Da or about 10,000 Da to about 12,000 Da or about 50,000 Da.

In some embodiments of the method, the silanol functional polymer is a silanol functional polydimethylsiloxane. In some embodiments, the silanol functional polymer is a silanol functional polymer having a OH(Me$_2$SiO)$_x$(R$_2$R$_1$SiO)$_y$OH backbone. In some embodiments, the silanol functional polymer is selected from silanol-terminated polydimethylsiloxane, silanol-terminated polydiphenylsiloxane, silanol-terminated diphenylsiloxane-dimethylsiloxane copolymer containing diphenylsiloxane monomers, silanol-terminated polytrifluoropropylmethylsiloxane, and combinations thereof. In some embodiments, the silanol functional polymer has a molecular weight of about 550 Da to about 1,200 Da or about 1,000 Da to about 1,400 Da or about 900 Da to about 50,000 Da or about 400 Da to about 140,000 Da.

In some embodiments of the method, the membrane has a crosslinking density of about $10\times10^{-5}$ mol/mL to about $30\times10^{-5}$ mol/mL.

In some embodiments of the method, the $C^{3+}$ hydrocarbons are more permeable through the membrane than methane.

DETAILED DESCRIPTION

Figure 1:
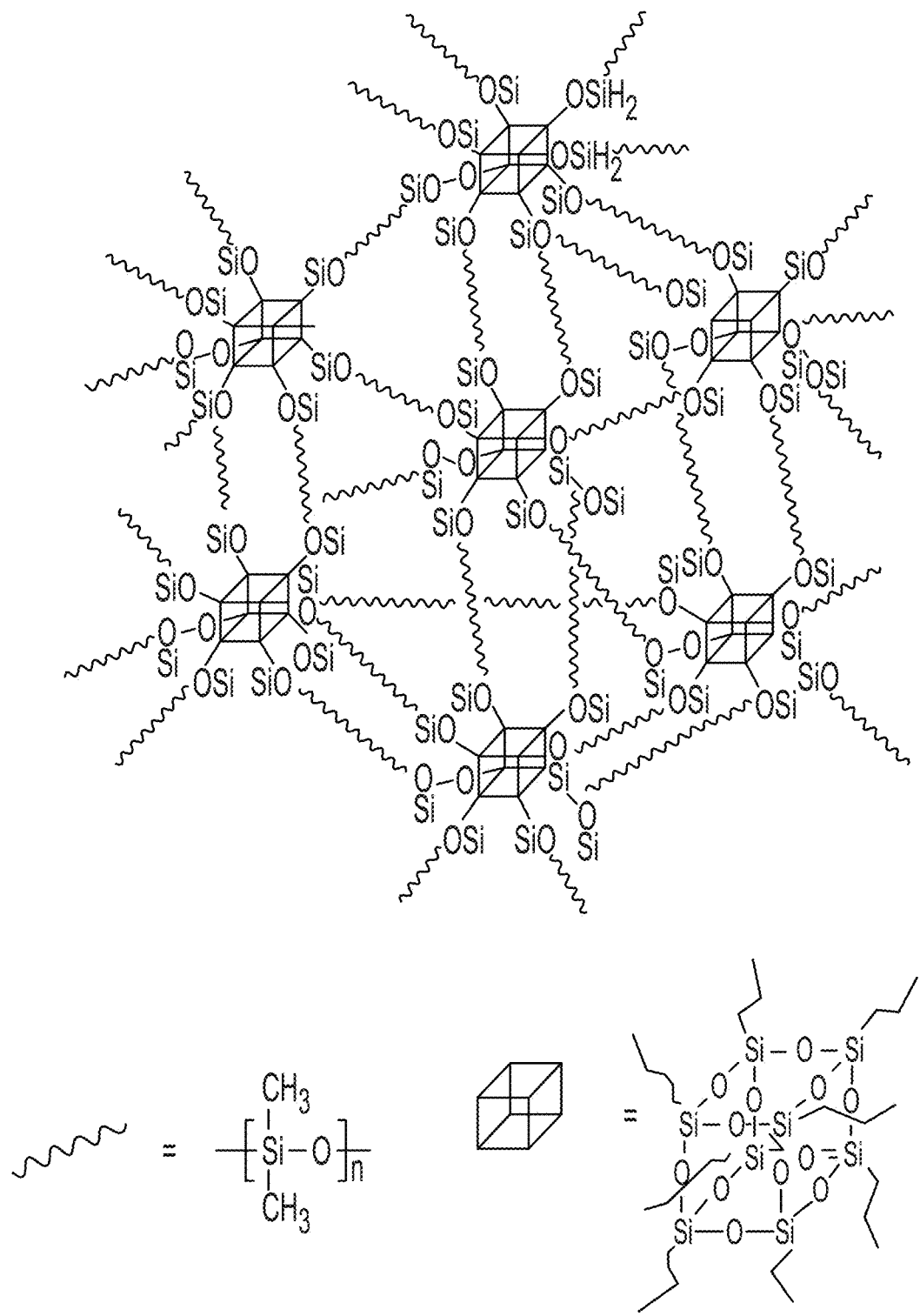
FIG. 1 is a depiction of the crosslinked siloxane organic-inorganic hybrid PDMS/POSS membrane material.

The present disclosure relates to crosslinked siloxane organic-inorganic hybrid membrane materials with enhanced separation performance for $C_{3+}$ hydrocarbon removal from natural gas. The membranes are polydimethylsiloxane (PDMS)-based membranes that contain a dual-functionalized polyhedral oligomeric silsesquioxane (POSS). The POSS can be used as both a crosslinking agent and a nanofiller in the PDMS membrane matrix. The hybrid membranes of the present disclosure can be prepared as thin film composites on microporous polyacrylonitrile (PAN) supports through the chemical reaction of the dual-functionalized POSS with functionalized PDMS materials. Also provided in the present disclosure are methods of $C_{3+}$ hydrocarbon removal from natural gas using the hybrid membranes containing the dual-functionalized POSS.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

PDMS/POSS Hybrid Membranes

Provided in the present disclosure are polymeric membranes for $C_{3+}$ hydrocarbon removal from natural gas. The polymeric membranes of the present disclosure are polydimethylsiloxane (PDMS)-based membranes that have been functionalized to increase the permeation properties of the membrane and improve membrane separation performance. In some embodiments, the polymeric membranes are organic-inorganic hybrid membranes. The organic-inorganic hybrid membranes of the present disclosure combine the desired properties of an organic and an inorganic system, for example, by improving the thermal, mechanical, and transport properties of the membranes.

The polymeric membranes of the present disclosure contain a functionalized polyhedral oligomeric silsesquioxane (POSS) compound. Polyhedral oligomeric silsesquioxane (POSS) is a cage-like molecule containing an inner inorganic framework ($Si_8O_{12}$ core) with an external shell of organic substituents (R) at each of the eight vertices, forming an intrinsic inorganic-organic architecture with the chemical formula $(RSiO_{3/2})_n$ that has the structure:

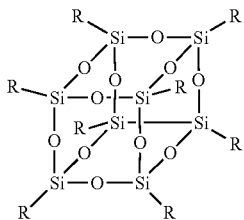

where R can be H, inert organic groups, or reactive functional groups.

Due to the well-defined structure and multi-functional groups that can be attached to the apex silicon atoms, POSS is compatible with diverse polymer matrices at the molecular level, and can be incorporated into a polymeric membrane to enhance polymer physical properties and performances. In order to achieve highly homogeneous organic-inorganic hybrid membrane materials for gas separation applications, chemical bonds between the POSS and the PDMS matrix are introduced, for example, by functionalizing the POSS, to improve membrane physical and permeation properties of the membranes of the present disclosure. The membranes of the present disclosure contain a functionalized POSS. In some embodiments, the membranes of the present disclosure that contain a functionalized POSS exhibit enhanced membrane separation efficiency (for example, $C_{3+}/CH_4$ selectivities) and enhanced membrane stability (for example, swelling resistance) as compared to PDMS membranes that do not contain the functionalized POSS compound of the present disclosure.

The crosslinked siloxane organic-inorganic hybrid membranes (PDMS/POSS hybrid membranes) of the present disclosure contain a functionalized POSS compound. The POSS can be functionalized with any group capable of forming a chemical bond with the PDMS matrix. In some embodiments, the functionalized POSS compound is functionalized with silicon hydride (—Si—H) moieties. In some embodiments, the functionalized POSS compound is functionalized with trialkoxysilicon groups. In some embodiments, the POSS compound is dual-functionalized with both silicon hydride (—Si—H) moieties and trialkoxysilicon groups that are attached to a central POSS core. In some embodiments, the trialkoxysilicon groups are attached to the central POSS core through an alkylene linker, for example, a $C_2$-$C_{11}$ alkylene linker.

In some embodiments, the POSS is functionalized with silicon hydride moieties and trialkoxysilicon groups at a ratio of 1:3, 1:1, or 3:1. In some embodiments, the POSS is functionalized with silicon hydride moieties and trialkoxysilicon groups at a ratio of 1:3. In some embodiments, the POSS is functionalized with silicon hydride moieties and trialkoxysilicon groups at a ratio of 1:1. In some embodiments, the POSS is functionalized with silicon hydride moieties and trialkoxysilicon groups at a ratio of 3:1.

The functionalized POSS compound of the present disclosure is a compound of Formula (I):

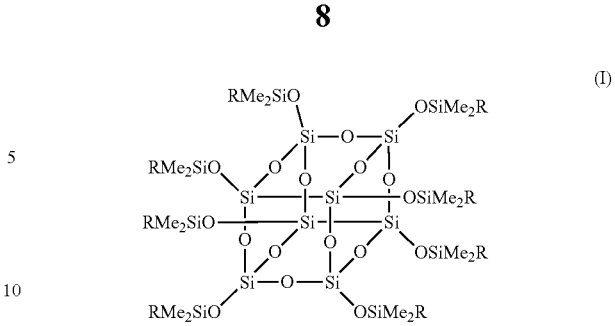

wherein each R is independently selected from H and —($C_2$-$C_{11}$ alkyl)-Si—O—($C_1$-$C_3$ alkyl)$_3$, and wherein the compound of Formula (I) comprises a ratio of H to —($C_2$-$C_{11}$ alkyl)-Si—O—($C_1$-$C_3$ alkyl)$_3$ of 1:3, 1:1, or 3:1.

In some embodiments, the —($C_2$-$C_{11}$ alkyl)-Si—O—($C_1$-$C_3$ alkyl)$_3$ is —($C_2$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_3$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_4$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_5$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_6$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_7$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_8$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_9$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_{10}$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_{11}$ alkyl)-Si—O—($C_1$-$C_3$ alkyl)$_3$. In some embodiments, the —($C_2$-$C_{11}$ alkyl)-Si—O—($C_1$-$C_3$ alkyl)$_3$ is —($C_2$-$C_{11}$ alkyl)-Si—O—($C_1$ alkyl)$_3$. In some embodiments, the $C_1$ alkyl is methyl. In some embodiments, the —($C_2$-$C_{11}$ alkyl)-Si—O—($C_1$-$C_3$ alkyl)$_3$ is —($C_2$-$C_{11}$ alkyl)-Si—O—($C_2$ alkyl)$_3$. In some embodiments, the $C_2$ alkyl is ethyl. In some embodiments, the —($C_2$-$C_{11}$ alkyl)-Si—O—($C_1$-$C_3$ alkyl)$_3$ is —($C_2$-$C_{11}$ alkyl)-Si—O—($C_3$ alkyl)$_3$. In some embodiments, the $C_3$ alkyl is isopropyl.

In some embodiments, the —($C_2$-$C_{11}$ alkyl)-Si—O—($C_1$-$C_3$ alkyl)$_3$ is —(CH$_2$CH$_2$)—Si—O—(CH$_3$)$_3$. In some embodiments, the —($C_2$-$C_{11}$ alkyl)-Si—O—($C_1$-$C_3$ alkyl)$_3$ is —(CH$_2$)$_3$—Si—O—(CH$_3$)$_3$. In some embodiments, the —($C_2$-$C_{11}$ alkyl)-Si—O—($C_1$-$C_3$ alkyl)$_3$ is —(CH$_2$)$_4$—Si—O—(CH$_3$)$_3$. In some embodiments, the —($C_2$-$C_{11}$ alkyl)-Si—O—($C_1$-$C_3$ alkyl)$_3$ is —(CH$_2$)$_5$—Si—O—(CH$_3$)$_3$. In some embodiments, the —($C_2$-$C_{11}$ alkyl)-Si—O—($C_1$-$C_3$ alkyl)$_3$ is —(CH$_2$)$_6$—Si—O—(CH$_3$)$_3$. In some embodiments, the —($C_2$-$C_{11}$ alkyl)-Si—O—($C_1$-$C_3$ alkyl)$_3$ is —(CH$_2$)$_7$—Si—O—(CH$_3$)$_3$. In some embodiments, the —($C_2$-$C_{11}$ alkyl)-Si—O—($C_1$-$C_3$ alkyl)$_3$ is —(CH$_2$)$_8$—Si—O—(CH$_3$)$_3$. In some embodiments, the —($C_2$-$C_{11}$ alkyl)-Si—O—($C_1$-$C_3$ alkyl)$_3$ is —(CH$_2$)$_9$—Si—O—(CH$_3$)$_3$. In some embodiments, the —($C_2$-$C_{11}$ alkyl)-Si—O—($C_1$-$C_3$ alkyl)$_3$ is —(CH$_2$)$_{10}$—Si—O—(CH$_3$)$_3$. In some embodiments, the —(C$_2$-C$_{11}$ alkyl)-Si—O—(C$_1$-C$_3$ alkyl)$_3$ is —(CH$_2$)$_{11}$—Si—O—(CH$_3$)$_3$. In some embodiments, the —(C$_2$-C$_{11}$ alkyl)-Si—O—(C$_1$-C$_3$ alkyl)$_3$ is —(CH$_2$CH$_2$)—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_3$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_4$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_5$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_6$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_7$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_8$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_9$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_{10}$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$)$_{11}$—Si—O—(CH$_2$CH$_3$)$_3$. In some embodiments, the —(C$_2$-C$_{11}$ alkyl)-Si—O—(C$_1$-C$_3$ alkyl)$_3$ is —(CH$_2$CH$_2$)—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_3$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_4$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_5$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_6$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_7$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_8$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_9$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_{10}$—Si—O—(CH(CH$_3$)$_2$)$_3$. In some embodiments, the —(C$_2$-C$_{11}$ alkyl)-Si—O—(C$_1$-C$_3$ alkyl)$_3$ is —(CH$_2$)$_{11}$—Si—O—(CH(CH$_3$)$_2$)$_3$.

In some embodiments, the compound of Formula (I) comprises a ratio of H to —(C$_2$-C$_{11}$ alkyl)-Si—O—(C$_1$-C$_3$ alkyl)$_3$ of 1:3. In some embodiments, the compound of Formula (I) comprises a ratio of H to —(C$_2$-C$_{11}$ alkyl)-Si—O—(C$_1$-C$_3$ alkyl)$_3$ of 1:1. In some embodiments, the compound of Formula (I) comprises a ratio of H to —(C$_2$-Cui alkyl)-Si—O—(C$_1$-C$_3$ alkyl)$_3$ of 3:1.

In some embodiments, the compound of Formula (I) comprises a ratio of H to —(C$_2$-C$_{11}$ alkyl)-Si—O—(C$_1$-C$_3$ alkyl)$_3$ of 1:3 and the —(C$_2$-C$_{11}$ alkyl)-Si—O—(C$_1$-C$_3$ alkyl)$_3$ is —(CH$_2$CH$_2$)—Si—O—(CH$_3$)$_3$. In some embodiments, the compound of Formula (I) comprises a ratio of H to —(C$_2$-C$_{11}$ alkyl)-Si—O—(C$_1$-C$_3$ alkyl)$_3$ of 1:1 and the —(C$_2$-C$_{11}$ alkyl)-Si—O—(C$_1$-C$_3$ alkyl)$_3$ is —(CH$_2$CH$_2$)—Si—O—(CH$_3$)$_3$. In some embodiments, the compound of Formula (I) comprises a ratio of H to —(C$_2$-C$_{11}$ alkyl)-Si—O—(C$_1$-C$_3$ alkyl)$_3$ of 3:1 and the —(C$_2$-C$_{11}$ alkyl)-Si—O—(C$_1$-C$_3$ alkyl)$_3$ is —(CH$_2$CH$_2$)—Si—O—(CH$_3$)$_3$.

In some embodiments, the compound of Formula (I) is a compound having the structure:

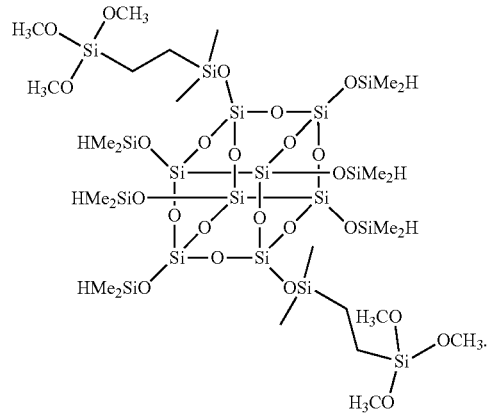

Also provided in the present disclosure are methods of preparing the functionalized POSS compound of Formula (I). In some embodiments, the compound of Formula (I) is prepared by reacting OctaSilane-POSS (OS-POSS), having the structure:

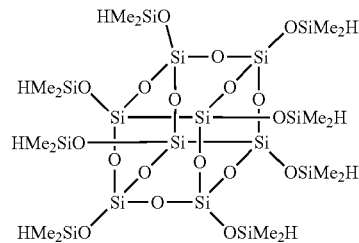

with an alkylsilane compound having a terminal alkene moiety. Suitable alkylsilane compounds having a terminal alkene moiety include, but are not limited to a vinylsilane (for example, trimethoxyvinylsilane, triethoxyvinylsilane, and triisopropoxyvinylsilane), an allylsilane (for example, allyltrimethoxysilane and allyltriethoxysilane), a 3-butenylsilane (for example, 3-butenyltrimethoxysilane), a 5-hexenylsilane (for example, 5-hexenyltriethoxysilane), a 7-octenyl silane (for example, 7-octenyltrimetoxysilane), and a 10-undecenoylsilane (for example, 10-undecenoyltrimethoxysilane). In some embodiments, the compound of Formula (I) is prepared by reacting OS-POSS with vinyltrimethoxysilane (VTMO).

In some embodiments, the compound of Formula (I) is prepared by controlling the molar ratio of the OS-POSS and the alkylsilane compound having a terminal alkene moiety. In some embodiments, the compound of Formula (I) is prepared by reacting the OS-POSS with the alkylsilane compound at a ratio of about 1:2 to about 1:6, such as about 1:2, 1:3, 1:4, 1:5, or 1:6. In some embodiments, the compound of Formula (I) is prepared by reacting the OS-POSS with the alkylsilane compound at a ratio of about 1:2. In some embodiments, the compound of Formula (I) is prepared by reacting the OS-POSS with the alkylsilane compound at a ratio of about 1:4. In some embodiments, the compound of Formula (I) is prepared by reacting the OS-POSS with the alkylsilane compound at a ratio of about 1:6. In some embodiments, the compound of Formula (I) is prepared by reacting the OS-POSS with VTMO at a ratio of about 1:2. In some embodiments, the compound of Formula (I) is prepared by reacting the OS-POSS with VTMO at a ratio of about 1:4. In some embodiments, the compound of Formula (I) is prepared by reacting the OS-POSS with VTMO at a ratio of about 1:6.

In some embodiments, the reaction is performed in the presence of a catalyst. In some embodiments, the catalyst is a platinum catalyst. Suitable platinum catalysts include, but are not limited to, platinum divinyltetramethyldisiloxane complexes, platinum cyclovinylmethylsiloxane complexes, and platinum carboxyl cyclovinylmethylsiloxane complexes. In some embodiments, the platinum catalyst is a platinum divinyltetramethyldisiloxane complex.

In some embodiments, the functionalized POSS compound of Formula (I) functions as a crosslinking agent in the membrane. In some embodiments, the functionalized POSS compound of Formula (I) functions as a filler in the membrane. In some embodiments, the functionalized POSS compound of Formula (I) functions as both a crosslinking agent and a filler in the membrane. In some embodiments, the functionalized POSS compound of Formula (I) is incorporated into a PDMS matrix in the form of either physically blended or chemically bonded composites. In some embodiments, the functionalized POSS compound of Formula (I) is incorporated into a PDMS matrix without particle aggregation and is able to integrate fully in the matrix.

The PDMS/POSS membranes of the present disclosure contain the functionalized POSS compound of Formula (I) within a modified PDMS matrix. For example, the functionalized POSS compound of Formula (I) is crosslinked with one or more polymers to form a crosslinked siloxane hybrid membrane (a PDMS/POSS membrane). The membrane material has the structure shown in FIG. 1. In some embodiments, the modified PDMS matrix is a modified siloxane terpolymer (Ter-PDMS) matrix. In some embodiments, the modified PDMS matrix contains a vinylsiloxane terpolymer, a silanol functional polymer, and combinations thereof. In some embodiments, the modified PDMS matrix contains a combination of vinylsiloxane terpolymers and silanol functional polymers.

In some embodiments, the vinylsiloxane terpolymer is a vinylmethylsiloxane-octylmethylsiloxane-dimethylsiloxane terpolymer. In some embodiments, the vinylsiloxane terpolymer is a vinylmethylsiloxane-octylmethylsiloxane-dimethylsiloxane terpolymer having a $(VinylMeSiO)_p(Me_2SiO)_m(R_1MeSiO)_n$ backbone.

In some embodiments, the vinylmethylsiloxane-octylmethylsiloxane-dimethylsiloxane terpolymer contains about 1% to about 5% vinylmethylsiloxane, such as about 3% to about 5% vinylmethylsiloxane, or about 1%, about 2%, about 3%, about 4%, or about 5% vinylmethylsiloxane. In some embodiments, the vinylmethylsiloxane-octylmethylsiloxane-dimethylsiloxane terpolymer contains about 1% to about 5% vinylmethylsiloxane. In some embodiments, the vinylmethylsiloxane-octylmethylsiloxane-dimethylsiloxane terpolymer contains about 3% to about 5% vinylmethylsiloxane.

In some embodiments, the vinylmethylsiloxane-octylmethylsiloxane-dimethylsiloxane terpolymer contains about 20% to about 40% octylmethylsiloxane, such as about 20% to about 30% octylmethylsiloxane, about 35% to about 40% octylmethylsiloxane, or about 20%, about 25%, about 30%, about 35%, or about 40% octylmethylsiloxane. In some embodiments, the vinylmethylsiloxane-octylmethylsiloxane-dimethylsiloxane terpolymer contains about 20% to about 30% octylmethylsiloxane. In some embodiments, the vinylmethylsiloxane-octylmethylsiloxane-dimethylsiloxane terpolymer contains about 35% to about 40% octylmethylsiloxane.

In some embodiments, the vinylmethylsiloxane-octylmethylsiloxane-dimethylsiloxane terpolymer contains about 3% to about 5% vinylmethylsiloxane, about 35% to about 40% octylmethylsiloxane, and the remainder dimethylsiloxane. In some embodiments, the vinylmethylsiloxane-octylmethylsiloxane-dimethylsiloxane terpolymer contains about 1% to about 5% vinylmethylsiloxane, about 20% to about 30% octylmethylsiloxane, and the remainder dimethylsiloxane.

In some embodiments, the vinylmethylsiloxane-octylmethylsiloxane-dimethylsiloxane terpolymer has a molecular weight of about 1,000 Daltons (Da) to about 100,000 Da, such as about 2,500 Da to about 50,000 Da, about 5,000 Da to about 40,000 Da, about 10,000 Da to about 30,000 Da, about 15,000 Da to about 25,000 Da, about 10,000 Da to about 12,000 Da, about 2,500 Da to about 3,000 Da, or about 1,000 Da, about 2,500 Da, about 3,000 Da, about 5,000 Da, about 10,000 Da, about 12,000 Da, about 15,000 Da, about 20,000 Da, about 25,000 Da, about 30,000 Da, about 35,000 Da, about 40,000 Da, about 45,000 Da, about 50,000 Da, about 60,000 Da, about 70,000 Da, about 80,000 Da, about 90,000 Da, or about 100,000 Da. In some embodiments, the vinylmethylsiloxane-octylmethylsiloxane-dimethylsiloxane terpolymer has a molecular weight of about 2,500 Da to about 3,000 Da. In some embodiments, the vinylmethylsiloxane-octylmethylsiloxane-dimethylsiloxane terpolymer has a molecular weight of about 10,000 Da to about 12,000 Da. In some embodiments, the vinylmethylsiloxane-octylmethylsiloxane-dimethylsiloxane terpolymer has a molecular weight of about 50,000 Da.

In some embodiments, the vinylmethylsiloxane-octylmethylsiloxane-dimethylsiloxane terpolymer contains about 3% to about 5% vinylmethylsiloxane, about 35% to about 40% octylmethylsiloxane, and the remainder dimethylsiloxane and has a molecular weight of about 2,500 Da to about 3,000 Da. In some embodiments, the vinylmethylsiloxane-octylmethylsiloxane-dimethylsiloxane terpolymer contains about 3% to about 5% vinylmethylsiloxane, about 35% to about 40% octylmethylsiloxane, and the remainder dimethylsiloxane and has a molecular weight of about 10,000 Da to about 12,000 Da. In some embodiments, the vinylmethylsiloxane-octylmethylsiloxane-dimethylsiloxane terpolymer contains about 1% to about 5% vinylmethylsiloxane, about 20% to about 30% octylmethylsiloxane, and the remainder dimethylsiloxane and has a molecular weight of about 50,000 Da.

In some embodiments, the vinylsiloxane terpolymer is a vinylmethylsiloxane-phenylmethylsiloxane-dimethylsiloxane terpolymer. In some embodiments, the vinylsiloxane terpolymer is a vinylmethylsiloxane-phenylmethylsiloxane-dimethylsiloxane terpolymer having a $(VinylMeSiO)_p(PhMeSiO)_m(R_1MeSiO)_n$ backbone.

In some embodiments, the vinylmethylsiloxane-phenylmethylsiloxane-dimethylsiloxane terpolymer contains about 1% to about 5% vinylmethylsiloxane, such as about 3% to about 5% vinylmethylsiloxane, or about 1%, about 2%, about 3%, about 4%, or about 5% vinylmethylsiloxane. In some embodiments, the vinylmethylsiloxane-phenylmethylsiloxane-dimethylsiloxane terpolymer contains about 1% to about 5% vinylmethylsiloxane. In some embodiments, the vinylmethylsiloxane-phenylmethylsiloxane-dimethylsiloxane terpolymer contains about 3% to about 5% vinylmethylsiloxane.

In some embodiments, the vinylmethylsiloxane-phenylmethylsiloxane-dimethylsiloxane terpolymer contains about 20% to about 40% phenylmethylsiloxane, such as about 20% to about 30% phenylmethylsiloxane, about 35% to about 40% phenylmethylsiloxane, or about 20%, about 25%, about 30%, about 35%, or about 40% phenylmethylsiloxane. In some embodiments, the vinylmethylsiloxane-phenylmethylsiloxane-dimethylsiloxane terpolymer contains about 20% to about 30% phenylmethylsiloxane. In some embodiments, the vinylmethylsiloxane-phenylmethylsiloxane-dimethylsiloxane terpolymer contains about 35% to about 40% phenylmethylsiloxane.

In some embodiments, the vinylmethylsiloxane-phenylmethylsiloxane-dimethylsiloxane terpolymer contains about 3% to about 5% vinylmethylsiloxane, about 35% to about 40% phenylmethylsiloxane, and the remainder dimethylsiloxane. In some embodiments, the vinylmethylsiloxane-phenylmethylsiloxane-dimethylsiloxane terpolymer contains about 1% to about 5% vinylmethylsiloxane, about 20% to about 30% phenylmethylsiloxane, and the remainder dimethylsiloxane.

In some embodiments, the vinylmethylsiloxane-phenylmethylsiloxane-dimethylsiloxane terpolymer has a molecular weight of about 1,000 Daltons (Da) to about 10,000 Da, such as about 2,000 Da to about 8,000 Da, about 2,500 Da to about 7,500 Da, about 3,000 Da to about 6,000 Da, about 4,000 Da to about 5,000 Da, or about 1,000 Da, about 1,500 Da, about 2,000 Da, about 2,500 Da, about 3,000 Da, about 4,000 Da, about 5,000 Da, about 6,000 Da, about 7,000 Da, about 8,000 Da, about 9,000 Da, or about 10,000 Da. In some embodiments, the vinylmethylsiloxane-phenylmethylsiloxane-dimethylsiloxane terpolymer has a molecular weight of about 2,500 Da to about 3,000 Da.

In some embodiments, the vinylmethylsiloxane-phenylmethylsiloxane-dimethylsiloxane terpolymer contains about 3% to about 5% vinylmethylsiloxane, about 35% to about 40% phenylmethylsiloxane, and the remainder dimethylsiloxane and has a molecular weight of about 2,500 Da to about 3,000 Da.

In some embodiments, the silanol functional polymer is a silanol functional polymer having a OH(Me$_2$SiO)$_x$(R$_2$R$_1$SiO)$_y$OH backbone. In some embodiments, the silanol functional polymer is selected from silanol-terminated polydimethylsiloxane, silanol-terminated polydiphenylsiloxane, silanol-terminated diphenylsiloxane-dimethylsiloxane copolymer containing diphenylsiloxane monomers, silanol-terminated polytrifluoropropylmethylsiloxane, and combinations thereof.

In some embodiments, the silanol functional polymer has a molecular weight of about 100 Daltons (Da) to about 200,000 Da, such as about 500 Da to about 150,000 Da, about 1,000 Da to about 100,000 Da, about 5,000 Da to about 50,000 Da, about 10,000 Da to about 35,000 Da, about 15,000 Da to about 25,000 Da, about 400 Da to about 140,000 Da, about 1,000 Da to about 1,400 Da, about 900 Da to about 50,000 Da, about 550 Da to about 1,200 Da, or about 100 Da, about 400 Da, about 550 Da, about 900 Da, about 1,000 Da, about 1,400 Da, about 2,500 Da, about 3,000 Da, about 5,000 Da, about 10,000 Da, about 12,000 Da, about 15,000 Da, about 20,000 Da, about 25,000 Da, about 30,000 Da, about 35,000 Da, about 40,000 Da, about 45,000 Da, about 50,000 Da, about 60,000 Da, about 70,000 Da, about 80,000 Da, about 90,000 Da, about 100,000 Da, about 125,000 Da, about 140,000 Da, about 150,000 Da, about 175,000 Da, or about 200,000 Da. In some embodiments, the silanol functional polymer has a molecular weight of about 550 Da to about 1,200 Da. In some embodiments, the silanol functional polymer has a molecular weight of about 1,000 Da to about 1,400 Da. In some embodiments, the silanol functional polymer has a molecular weight of about 900 Da to about 50,000 Da. In some embodiments, the silanol functional polymer has a molecular weight of about 400 Da to about 140,000 Da.

In some embodiments, the silanol functional polymer is a silanol-terminated polydimethylsiloxane with a molecular weight of about 400 Da to about 140,000 Da.

In some embodiments, the silanol functional polymer is a silanol-terminated polydiphenylsiloxane with a molecular weight of about 1,000 Da to about 1,400 Da.

In some embodiments, the silanol functional polymer is a silanol-terminated diphenylsiloxane-dimethylsiloxane copolymer containing diphenylsiloxane monomers. In some embodiments, the silanol-terminated diphenylsiloxane-dimethylsiloxane copolymer contains about 1% to about 25% diphenylsiloxane monomers, such as about 2% to about 20%, or about 2.5% to about 18%. In some embodiments, the silanol-terminated diphenylsiloxane-dimethylsiloxane copolymer contains about 2.5% to about 18% diphenylsiloxane monomers. In some embodiments, the silanol functional polymer is a silanol-terminated diphenylsiloxane-dimethylsiloxane copolymer containing about 2.5% to about 18% diphenylsiloxane monomers having a molecular weight of about 900 Da to about 50,000 Da.

In some embodiments, the silanol functional polymer is a silanol-terminated polytrifluoropropylmethylsiloxane with a molecular weight of about 550 Da to about 1,200 Da.

Figure 2:
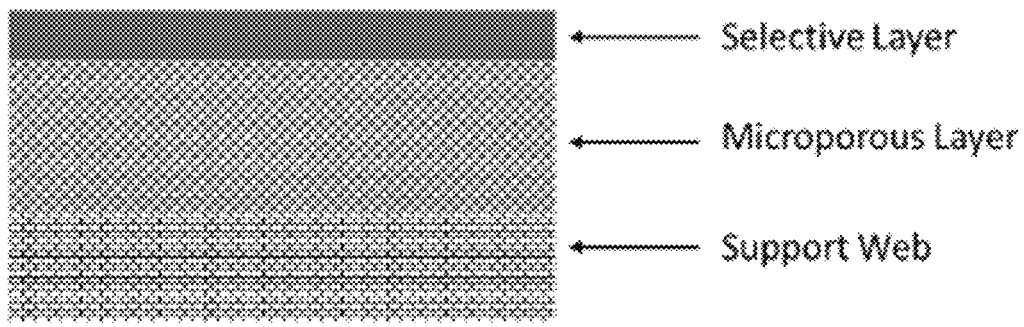
FIG. 2 illustrates the thin film structure of the composite PDMS/POSS hybrid membrane.

In some embodiments, the PDMS/POSS hybrid membrane is prepared as a thin film composite on microporous polyacrylonitrile (PAN) supports (FIG. 2). Other suitable microporous polymer supports include, but are not limited to, polyvinylidene fluoride (PVDF), polyether sulfone (PES), and polysulfone (PSF) supports.

Figure 3:
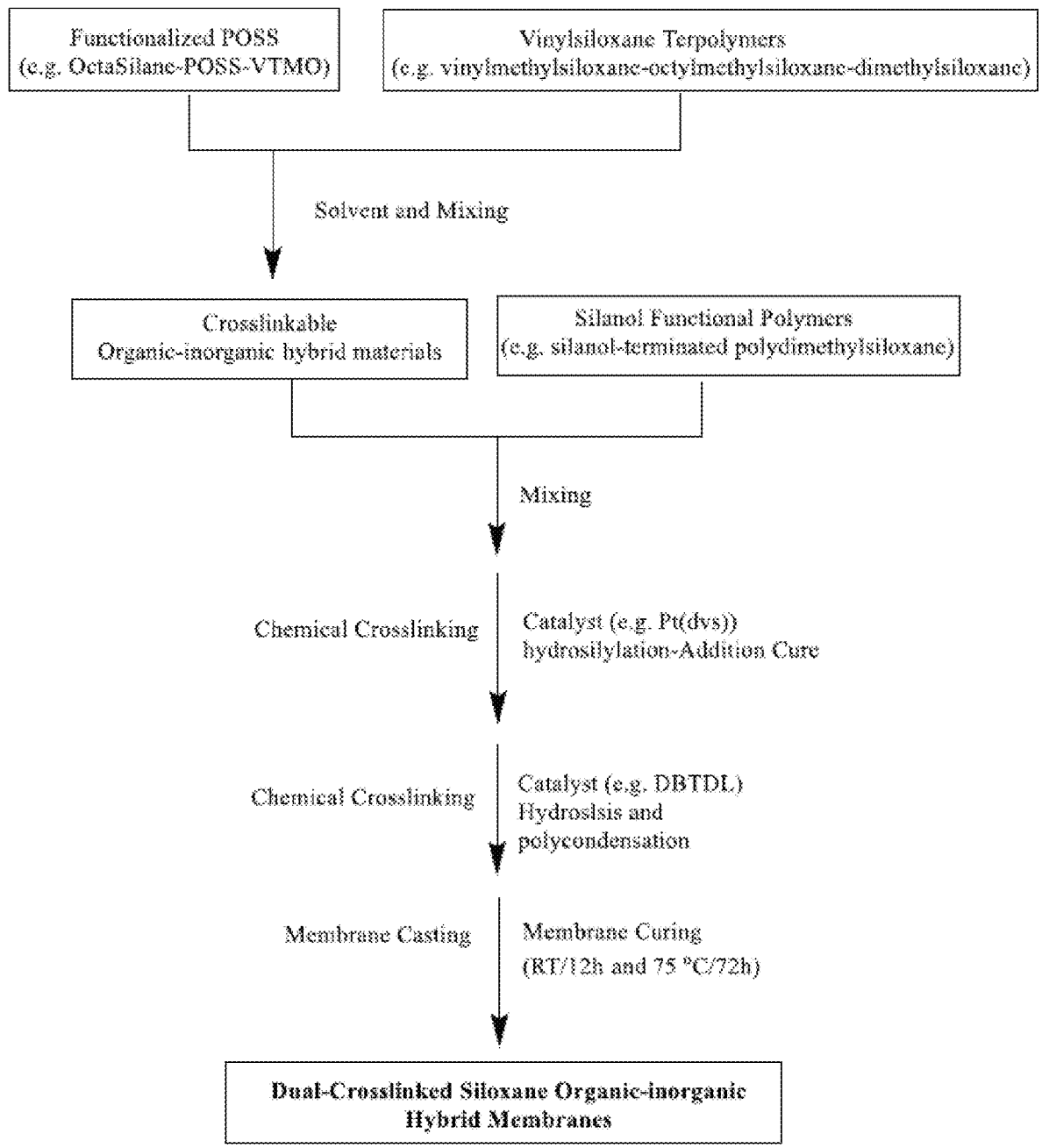
FIG. 3 is a flowchart showing the steps used an exemplary embodiment of preparing the PDMS/POSS crosslinked siloxane organic-inorganic hybrid membranes.

Thus, also provided are methods of preparing the PDMS/POSS hybrid membranes of the present disclosure. In some embodiments, the PDMS/POSS hybrid membrane is prepared by reacting the functionalized POSS compound of Formula (I) with a vinylmethylsiloxane terpolymer and a silanol functional polymer. In some embodiments, the compound of Formula (I) is reacted with a vinylmethylsiloxane terpolymer prior to reacting with a silanol functional polymer. In some embodiments, the compound of Formula (I) is reacted with a vinylmethylsiloxane terpolymer after reacting with a silanol functional polymer. In some embodiments, the compound of Formula (I) is reacted with a vinylmethylsiloxane terpolymer simultaneously with a silanol functional polymer. In some embodiments, the vinylmethylsiloxane terpolymer and the silanol functional polymer are as described in the present disclosure. FIG. 3 is a flowchart illustrating an exemplary embodiment of preparing the PDMS/POSS hybrid membranes of the present disclosure.

In some embodiments, the reaction between the functionalized POSS compound of Formula (I) and a vinylmethylsiloxane terpolymer and a silanol functional polymer occurs in the presence of one or more catalysts. In some embodiments, the catalyst is a platinum-divinyl tetramethylsiloxane complex catalyst (Pt(dvs)), dibutyltin dilaurate (DBTDL), or a combination thereof. In some embodiments, the catalyst is a platinum-divinyl tetramethylsiloxane complex catalyst (Pt(dvs)). In some embodiments, the catalyst is dibutyltin dilaurate (DBTDL).

In some embodiments, the membrane is prepared through the chemical reaction of the functionalized POSS compound of Formula (I) with both vinylmethylsiloxane terpolymers and silanol functional polymers using hydrosilylation-addition cure (platinum cure) and condensation cure (hydrolysis-polycondensation) chemistry. In some embodiments, the hydrosilylation-addition cure (platinum cure) and the condensation cure (hydrolysis-polycondensation) occur simultaneously.

The membranes of the present disclosure can be prepared as a thin film composite membrane of any appropriate support. In some embodiments, the support is a polyacrylonitrile (PAN) support. In some embodiments, the support is a microporous PAN support.

Methods of Removing $C_{3+}$ Hydrocarbons from Natural Gas

Figure 4:
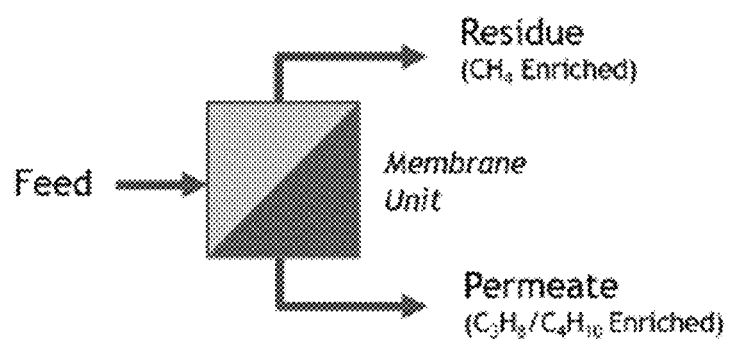
FIG. 4 is a scheme of a rubbery membrane process configuration for enhanced C3+ heavy hydrocarbons recovery from natural gas.

Polymeric membranes are thin semipermeable barriers that selectively separate some gas compounds from others. The membranes are dense films that do not operate as a filter, but rather separate gas compounds based on how well the different compounds dissolve into the membrane and diffuse through it (the solution-diffusion model). A simple membrane-processing scheme is shown in FIG. 4 for natural gas separation and upgrading, where a feed gas containing condensable gases (for example, propane ($C_3H_8$) and butane ($C_4H_{10}$)), and other non-condensable gases (for example, methane ($CH_4$) and nitrogen ($N_2$)) can be separated into a permeate stream rich in $C_{3+}$ heavy hydrocarbons ($C_3H_8$ and $C_4H_{10}$ enriched) and a $CH_4$-rich residual stream. Rubbery siloxane membranes, such as polydimethylsiloxane (PDMS), find industrial application for $C_{3+}$ heavy hydrocarbons recovery from natural gas; however, conventional PDMS membranes with a flexible ($Me_2SiO)_x$ backbone can exhibit lower selectivities of $C_{3+}$ hydrocarbons to methane (for example, $C_3H_8/CH_4$ and $C_4H_{10}/CH_4$ selectivities) due to higher degree of swelling under aggressive feed streams and operating conditions. The hybrid PDMS/POSS membranes of the present disclosure achieve enhanced $C_{3+}$ hydrocarbon recovery from natural gas while reducing capital and operating expenditures. In some embodiments, the PDMS/POSS membranes exhibit enhanced separation performance under simulated field gas composition conditions (such as feed pressure of up to 800 psi for a multicomponent gas mixture consisting $C_1$-$C_5$ hydrocarbons, $CO_2$, $N_2$, and BTEX representative aromatic hydrocarbons).

In some embodiments, the PDMS/POSS hybrid membranes of the present disclosure demonstrate increased crosslinking density compared to conventional crosslinked PDMS membranes and crosslinked siloxane membranes. In some embodiments, the PDMS/POSS hybrid membranes of the present disclosure have a crosslinking density (v) of about $4 \times 10^{-5}$ mol/mL or greater, such as about $5 \times 10^{-5}$ mol/mL to about $50 \times 10^{-5}$ mol/mL, about $10 \times 10^{-5}$ mol/mL to about $40 \times 10^{-5}$ mol/mL, about $15 \times 10^{-5}$ mol/mL to about $35 \times 10^{-5}$ mol/mL, about $20 \times 10^{-5}$ mol/mL to about $30 \times 10^{-5}$ mol/mL, or about $5 \times 10^{-5}$ mol/mL, about $10 \times 10^{-5}$ mol/mL, about $11 \times 10^{-5}$ mol/mL, about $15 \times 10^{-5}$ mol/mL, about $20 \times 10^{-5}$ mol/mL, about $25 \times 10^{-5}$ mol/mL, about $30 \times 10^{-5}$ mol/mL, about $35 \times 10^{-5}$ mol/mL, about $40 \times 10^{-5}$ mol/mL, about $45 \times 10^{-5}$ mol/mL, or about $50 \times 10^{-5}$ mol/mL. In some embodiments, the PDMS/POSS hybrid membranes of the present disclosure have a crosslinking density (v) of about $10 \times 10^{-5}$ mol/mL to about $15 \times 10^{-5}$ mol/mL. In some embodiments, the PDMS/POSS hybrid membranes of the present disclosure have a crosslinking density (v) of about $20 \times 10^{-5}$ mol/mL to about $30 \times 10^{-5}$ mol/mL. In some embodiments, the PDMS/POSS hybrid membranes of the present disclosure have a crosslinking density (v) of about $11 \times 10^{-5}$ mol/mL. In some embodiments, the PDMS/POSS hybrid membranes of the present disclosure have a crosslinking density (v) of about $25 \times 10^{-5}$ mol/mL.

In some embodiments, the PDMS/POSS hybrid membranes of the present disclosure demonstrate enhanced swelling resistance (lower swelling degree (Q)) compared to conventional crosslinked PDMS membranes and crosslinked siloxane membranes. In some embodiments, the PDMS/POSS hybrid membranes of the present disclosure have a swelling degree (Q) of about 2.00 or lower, such as about 0.10 to about 2.00, about 0.10 to about 1.99, about 0.25 to about 1.75, about 0.50 to about 1.50, about 0.75 to about 1.25, about 1.00 to about 1.50, about 1.25 to about 1.75, or about 0.10, about 0.25, about 0.50, about 0.75, about 1.00, about 1.25, about 1.38, about 1.50, about 1.59, about 1.75, or about 2.00. In some embodiments, the PDMS/POSS hybrid membranes of the present disclosure have a swelling degree (Q) of about 1.25 to about 1.50. In some embodiments, the PDMS/POSS hybrid membranes of the present disclosure have a swelling degree (Q) of about 1.50 to about 1.75. In some embodiments, the PDMS/POSS hybrid membranes of the present disclosure have a swelling degree (Q) of about 1.38. In some embodiments, the PDMS/POSS hybrid membranes of the present disclosure have a swelling degree (Q) of about 1.59.

In some embodiments, the PDMS/POSS hybrid membranes of the present disclosure show increased single gas selectivities for $C_{3+}/CH_4$ compared to conventional crosslinked PDMS membranes and crosslinked siloxane membranes under the same testing conditions, such as feed temperature of 25° C. and feed pressure of 1 bar. In some embodiments, the PDMS/POSS hybrid membranes of the present disclosure exhibit increased $C_3H_8/CH_4$ single gas selectivities as compared to conventional crosslinked PDMS membranes and crosslinked siloxane membranes under the same testing conditions. In some embodiments, the PDMS/POSS hybrid membranes of the present disclosure have $C_3H/CH_4$ single gas selectivities ($\alpha C_3H_8/CH_4$) of about 5 or more, such as about 7 to about 100, about 10 to about 90, about 20 to about 80, about 30 to about 70, about 40 to about 60, about 45 to about 55, about 5 to about 10, about 10 to about 15, or about 7, about 7.5, about 10, about 12, about 13, about 15, about 20, about 25, about 30, about 35, about 40, about 45, about 50, about 55, about 60, about 65, about 70, about 75, about 80, about 85, about 90, about 95, or about 100 when tested at feed temperature of 25° C. and feed pressure of 1 bar. In some embodiments, the PDMS/POSS hybrid membranes of the present disclosure have $C_3H_8/CH_4$ single gas selectivities ($\alpha C_3Ha/CH_4$) of about 7 to about 10 when tested at feed temperature of 25° C. and feed pressure of 1 bar. In some embodiments, the PDMS/POSS hybrid membranes of the present disclosure have $C_3H/CH_4$ single gas selectivities ($\alpha C_3H_8/CH_4$) of about 10 to about 15 when tested at feed temperature of 25° C. and feed pressure of 1 bar. In some embodiments, the PDMS/POSS hybrid membranes of the present disclosure have $C_3H_8/CH_4$ single gas selectivities ($\alpha C_3Hg/CH_4$) of about 7.5 when tested at feed temperature of 25° C. and feed pressure of 1 bar. In some embodiments, the PDMS/POSS hybrid membranes of the present disclosure have $C_3H_8/CH_4$ single gas selectivities ($\alpha C_3H\&/CH_4$) of about 12.6 when tested at feed temperature of 25° C. and feed pressure of 1 bar.

In some embodiments, the PDMS/POSS hybrid membranes of the present disclosure exhibit increased $C_4H_{10}/CH_4$ single gas selectivities as compared to conventional crosslinked PDMS membranes and crosslinked siloxane membranes under the same testing conditions. In some embodiments, the PDMS/POSS hybrid membranes of the present disclosure have $C_4H_{10}/CH_4$ single gas selectivities ($\alpha C_4H_{10}/CH_4$) of about 15 or more, such as about 15 to about 100, about 20 to about 90, about 30 to about 80, about 30 to about 75, about 40 to about 60, about 45 to about 55, about 30 to about 40, about 65 to about 75, or about 20, about 25, about 30, about 34.5, about 35, about 40, about 45, about 50, about 55, about 60, about 65, about 70, about 72, about 75, about 80, about 85, about 90, about 95, or about 100 when tested at feed temperature of 25° C. and feed pressure of 1 bar. In some embodiments, the PDMS/POSS hybrid membranes of the present disclosure have $C_4H_{10}/CH_4$ single gas selectivities ($\alpha C_4H_{10}/CH_4$) of about 30 to about 40 when tested at feed temperature of 25° C. and feed pressure of 1 bar. In some embodiments, the PDMS/POSS hybrid membranes of the present disclosure have $C_4H_{10}/CH_4$ single gas selectivities ($\alpha C_4H_{10}/CH_4$) of about 65 to about 75 when tested at feed temperature of 25° C. and feed pressure of 1 bar. In some embodiments, the PDMS/POSS hybrid membranes of the present disclosure have $C_4H_{10}/CH_4$ single gas selectivities ($\alpha C_4H_{10}/CH_4$) of about 34.5 when tested at feed temperature of 25° C. and feed pressure of 1 bar. In some embodiments, the PDMS/POSS hybrid membranes of the present disclosure have $C_4H_{10}/CH_4$ single gas selectivities ($\alpha C_4H_{10}/CH_4$) of about 72.25 when tested at feed temperature of 25° C. and feed pressure of 1 bar.

In some embodiments, the PDMS/POSS hybrid membranes of the present disclosure show increased mixed gas selectivities for $C_{3+}/CH_4$ compared to conventional crosslinked PDMS membranes and crosslinked siloxane membranes under the same multi-component gas mixture testing conditions, such as at feed temperature of 25° C. and feed pressure of 800 psi (55 bar). In some embodiments, the multi-component gas mixture is a 6-component gas mixture. In some embodiments, the multi-component gas mixture is a 6-component gas mixture containing $CO_2$, $N_2$, $C_2H_6$, $C_3H_8$, $C_4H_{10}$, and $CH_4$. In some embodiments, the multi-component gas mixture is a 6-component gas mixture containing about 12% $CO_2$, about 12% $N_2$, about 5% $C_2H_6$, about 3% $C_3H_8$, about 1.5% $C_4H_{10}$, and about 66.5% $CH_4$. In some embodiments, the PDMS/POSS hybrid membranes of the present disclosure exhibit increased $C_3H_8/CH_4$ mixed gas selectivities as compared to conventional crosslinked PDMS membranes and crosslinked siloxane membranes under the same testing conditions in a 6-component gas mixture. In some embodiments, the PDMS/POSS hybrid membranes of the present disclosure have $C_3H_8/CH_4$ mixed gas selectivities ($\alpha C_3Ha/CH_4$) of about 5 or more, such as about 7 to about 100, about 10 to about 90, about 20 to about 80, about 30 to about 70, about 40 to about 60, about 45 to about 55, about 5 to about 10, about 10 to about 15, or about 7, about 7.5, about 10, about 12, about 13, about 15, about 20, about 25, about 30, about 35, about 40, about 45, about 50, about 55, about 60, about 65, about 70, about 75, about 80, about 85, about 90, about 95, or about 100 when tested at feed temperature of 25° C. and feed pressure of 800 psi in a 6-component gas mixture. In some embodiments, the PDMS/POSS hybrid membranes of the present disclosure have $C_3H_8/CH_4$ mixed gas selectivities ($\alpha C_3H_8/CH_4$) of about 6 to about 10 when tested at feed temperature of 25° C. and feed pressure of 800 psi in a 6-component gas mixture. In some embodiments, the PDMS/POSS hybrid membranes of the present disclosure have $C_3H_8/CH_4$ mixed gas selectivities ($\alpha C_3H_8/CH_4$) of about 7 when tested at feed temperature of 25° C. and feed pressure of 800 psi in a 6-component gas mixture.

In some embodiments, the PDMS/POSS hybrid membranes of the present disclosure exhibit increased $C_4H_{10}/CH_4$ mixed gas selectivities as compared to conventional crosslinked PDMS membranes and crosslinked siloxane membranes under the same testing conditions in a 6-component gas mixture. In some embodiments, the PDMS/POSS hybrid membranes of the present disclosure have $C_4H_{10}/CH_4$ mixed gas selectivities ($\alpha C_4H_{10}/CH_4$) of about 10 or more, such as about 15 to about 100, about 20 to about 90, about 30 to about 80, about 40 to about 70, about 50 to about 60, about 45 to about 55, about 15 to about 20, or about 10, about 15, about 16, about 17, about 20, about 25, about 30, about 35, about 40, about 45, about 50, about 55, about 60, about 65, about 70, about 75, about 80, about 85, about 90, about 95, or about 100 when tested at feed temperature of 25° C. and feed pressure of 800 psi in a 6-component gas mixture. In some embodiments, the PDMS/POSS hybrid membranes of the present disclosure have $C_4H_{10}/CH_4$ mixed gas selectivities ($\alpha C_4H_{10}/CH_4$) of about 15 to about 20 when tested at feed temperature of 25° C. and feed pressure of 800 psi in a 6-component gas mixture. In some embodiments, the PDMS/POSS hybrid membranes of the present disclosure have $C_4H_{10}/CH_4$ mixed gas selectivities ($\alpha C_4H_{10}/CH_4$) of about 16 when tested at feed temperature of 25° C. and feed pressure of 800 psi in a 6-component gas mixture. In some embodiments, the PDMS/POSS hybrid membranes of the present disclosure have $C_4H_{10}/CH_4$ mixed gas selectivities ($\alpha C_4H_{10}/CH_4$) of about 17 when tested at feed temperature of 25° C. and feed pressure of 800 psi in a 6-component gas mixture.

In some embodiments, the PDMS/POSS hybrid membranes of the present disclosure show increased mixed gas selectivities for $C_{3+}/CH_4$ compared to conventional crosslinked PDMS membranes and crosslinked siloxane membranes under conditions that resemble a natural gas well, for example, a multi-component gas mixture at feed pressure of 800 psi. In some embodiments, the multi-component gas mixture is a 7-component gas mixture. In some embodiments, the multi-component gas mixture is a 7-component gas mixture containing $N_2$, $CH_4$, $C_2H_6$, $C_3H_8$, $C_4H_{10}$, $C_5H_{12}$, and toluene. In some embodiments, the multi-component gas mixture is a 7-component gas mixture containing about 14% $N_2$, about 78% $CH_4$, about 5% $C_2H_6$, about 2% $C_3H_8$, about 0.5% $C_4H_{10}$, about 0.5% $C_5H_{12}$, and about 500 ppm toluene. In some embodiments, the PDMS/POSS hybrid membranes of the present disclosure exhibit increased $C_3H_8/CH_4$ mixed gas selectivities as compared to conventional crosslinked PDMS membranes and crosslinked siloxane membranes under the same testing conditions in a 7-component gas mixture. In some embodiments, the PDMS/POSS hybrid membranes of the present disclosure have $C_3H/CH_4$ mixed gas selectivities ($\alpha C_3H_8/CH_4$) of about 5 or more, such as about 7 to about 100, about 10 to about 90, about 20 to about 80, about 30 to about 70, about 40 to about 60, about 45 to about 55, about 5 to about 10, about 10 to about 15, or about 7, about 7.5, about 10, about 12, about 13, about 15, about 20, about 25, about 30, about 35, about 40, about 45, about 50, about 55, about 60, about 65, about 70, about 75, about 80, about 85, about 90, about 95, or about 100 when tested at feed temperature of 25° C. and feed pressure of 800 psi in a 7-component gas mixture. In some embodiments, the PDMS/POSS hybrid membranes of the present disclosure have $C_3H_8/CH_4$ mixed gas selectivities ($\alpha C_3H_8/CH_4$) of about 6 to about 10 when tested at feed temperature of 25° C. and feed pressure of 800 psi in a 7-component gas mixture. In some embodiments, the PDMS/POSS hybrid membranes of the present disclosure have $C_3H_8/CH_4$ mixed gas selectivities ($\alpha C_3H_8/CH_4$) of about 8 when tested at feed pressure of 800 psi in a 7-component gas mixture.

In some embodiments, the PDMS/POSS hybrid membranes of the present disclosure exhibit increased $C_4H_{10}/CH_4$ mixed gas selectivities as compared to conventional crosslinked PDMS membranes and crosslinked siloxane membranes under the same testing conditions in a 7-component gas mixture. In some embodiments, the PDMS/POSS hybrid membranes of the present disclosure have $C_4H_{10}/CH_4$ mixed gas selectivities ($\alpha C_4H_{10}/CH_4$) of about 5 or more, such as about 10 to about 100, about 15 to about 90, about 20 to about 80, about 30 to about 70, about 40 to about 60, about 45 to about 55, about 10 to about 15, about 15 to about 20, or about 10, about 11, about 15, about 18, about 19, about 20, about 25, about 30, about 35, about 40, about 45, about 50, about 55, about 60, about 65, about 70, about 75, about 80, about 85, about 90, about 95, or about 100 when tested at feed temperature of 25° C. and feed pressure of 800 psi in a 7-component gas mixture. In some embodiments, the PDMS/POSS hybrid membranes of the present disclosure have $C_4H_{10}/CH_4$ mixed gas selectivities ($\alpha C_4H_{10}/CH_4$) of about 10 to about 15 when tested at feed temperature of 25° C. and feed pressure of 800 psi in a 7-component gas mixture. In some embodiments, the PDMS/POSS hybrid membranes of the present disclosure have $C_4H_{10}/CH_4$ mixed gas selectivities ($\alpha C_4H_{10}/CH_4$) of about 15 to about 20 when tested at feed temperature of 25° C. and feed pressure of 800 psi in a 7-component gas mixture. In some embodiments, the PDMS/POSS hybrid membranes of the present disclosure have $C_4H_{10}/CH_4$ mixed gas selectivities ($\alpha C_4H_{10}/CH_4$) of about 11 when tested at feed temperature of 25° C. and feed pressure of 800 psi in a 7-component gas mixture. In some embodiments, the PDMS/POSS hybrid membranes of the present disclosure have $C_4H_{10}/CH_4$ mixed gas selectivities ($\alpha C_4H_{10}/CH_4$) of about 19 when tested at feed temperature of 25° C. and feed pressure of 800 psi in a 7-component gas mixture.

Thus, provided are methods of separating $C_{3+}$ hydrocarbons from natural gas. The methods involve providing a PDMS/POSS hybrid membrane, such as a membrane of the present disclosure, introducing a natural gas stream to the membrane, and separating the $C_{3+}$ hydrocarbons from the natural gas. In some embodiments, the $C^{3+}$ hydrocarbons are more permeable through the membrane than methane. In some embodiments, after removal, the $C_{3+}$ hydrocarbons are recovered and reused. For example, the recovered $C_{3+}$ hydrocarbons can be used as chemical feedstock, as a liquid fuel for power generation, or for seawater desalination, among other uses. In some embodiments, the $C_{3+}$ hydrocarbons separated from the natural gas is propane ($C_3H_8$). In some embodiments, the $C_{3+}$ hydrocarbons separated from the natural gas is butane ($C_4H_{10}$). In some embodiment, the $C_{3+}$ hydrocarbons separated from the natural gas are propane ($C_3H_8$) and butane ($C_4H_{10}$).

In some embodiments of the methods, the PDMS/POSS hybrid membrane is a membrane of the present disclosure that contains a functionalized POSS compound crosslinked with a vinylsiloxane terpolymer, a silanol-terminated polydimethylsilicon, or both. In some embodiments, the functionalized POSS compound is a compound of Formula (I) crosslinked with vinylsiloxane terpolymers and silanol-terminated polydimethylsilicons. In some embodiments, the membrane is prepared as a thin film composite on a microporous polyacrylonitrile (PAN) support.

Though the present disclosure describes the use of the PDMS/POSS hybrid membrane for gas separation, the membranes can also fine utility in other applications, including, but not limited to, forward osmosis (FO), desulfurization dehydration, and pervaporation applications.

EXAMPLES

Example 1—Preparation of Crosslinked Siloxane-POSS Organic-Inorganic Hybrid Membranes Two hybrid composite membranes containing the crosslinked siloxane organic-inorganic hybrid membrane material shown in FIG. 1 on a microporous polyacrylonitrile (PAN) support were prepared (PDMS/POSS-1 and PDMS/POSS-2). The membrane material was prepared by first preparing a functionalized POSS compound according to Scheme 1.

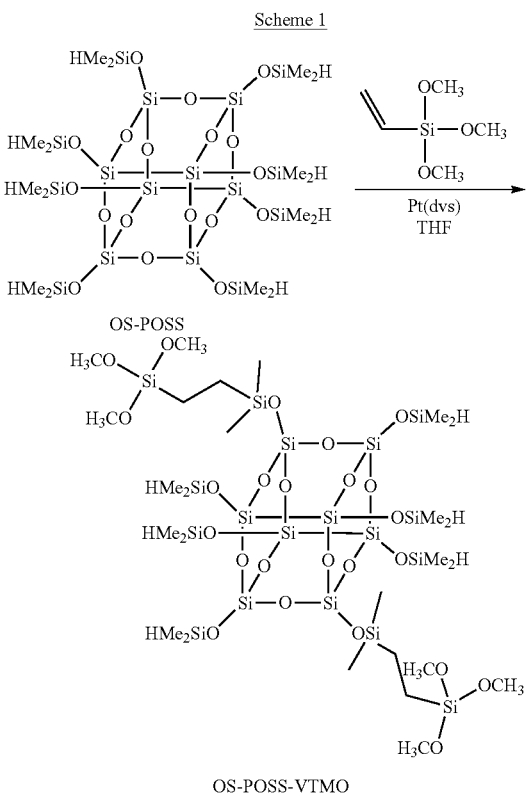

Figure 5:
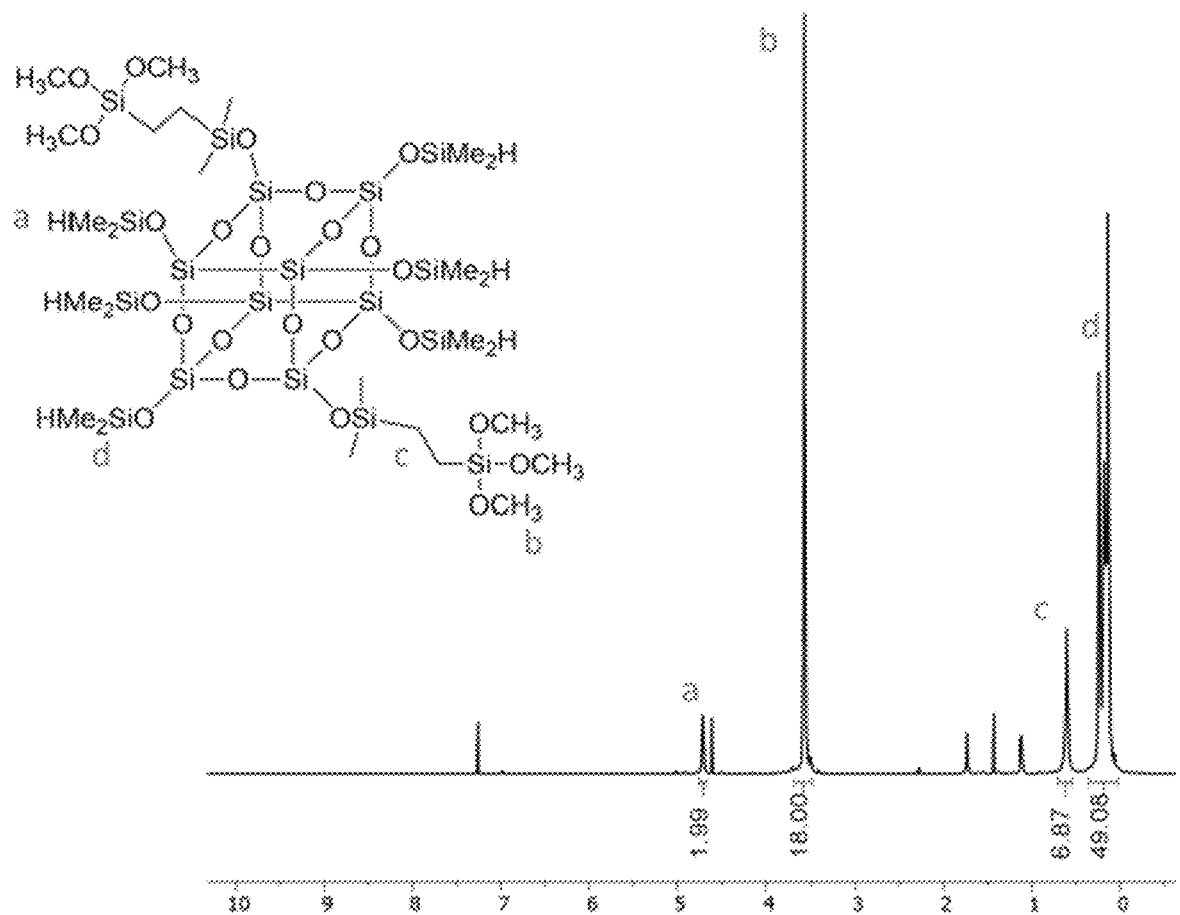
FIG. 5 is the $^1$H-NMR spectra in CDCl$_3$ of the compound of Formula (I).

To prepare the functionalized POSS compound, 10 mmol OctaSilane POSS (OS-POSS) was dissolved in 250 mL THF, then 20 mmol vinyltrimethoxysilane (VTMO) was mixed with efficient stirring. A platinum catalyst (10 drops) was added into the mixed solution under a nitrogen inlet. The solution was refluxed for 8 hours. The solution was distilled and fractions of distillate collected at 60° C. (95% pure) and 90° C. (>98% pure)(OS-POSS-VTMO-1 and OS-POSS-VTMO-2, respectively) were used as a crosslinking agent for membrane fabrication. The functionalized POSS compounds were characterized structurally via nuclear magnetic resonance spectroscopy (Bruker Ascend 500 MHz NMR spectrometer), and the $^1H$ spectrum of the product in $CDC_3$ is shown in FIG. 5. The NMR showed >98% purity in the distilled batch.

Scheme 2 illustrates the route used to prepare the crosslinked siloxane-POSS organic-inorganic hybrid membranes PDMS/POSS-1 and PDMS/POSS-2.

Scheme 2

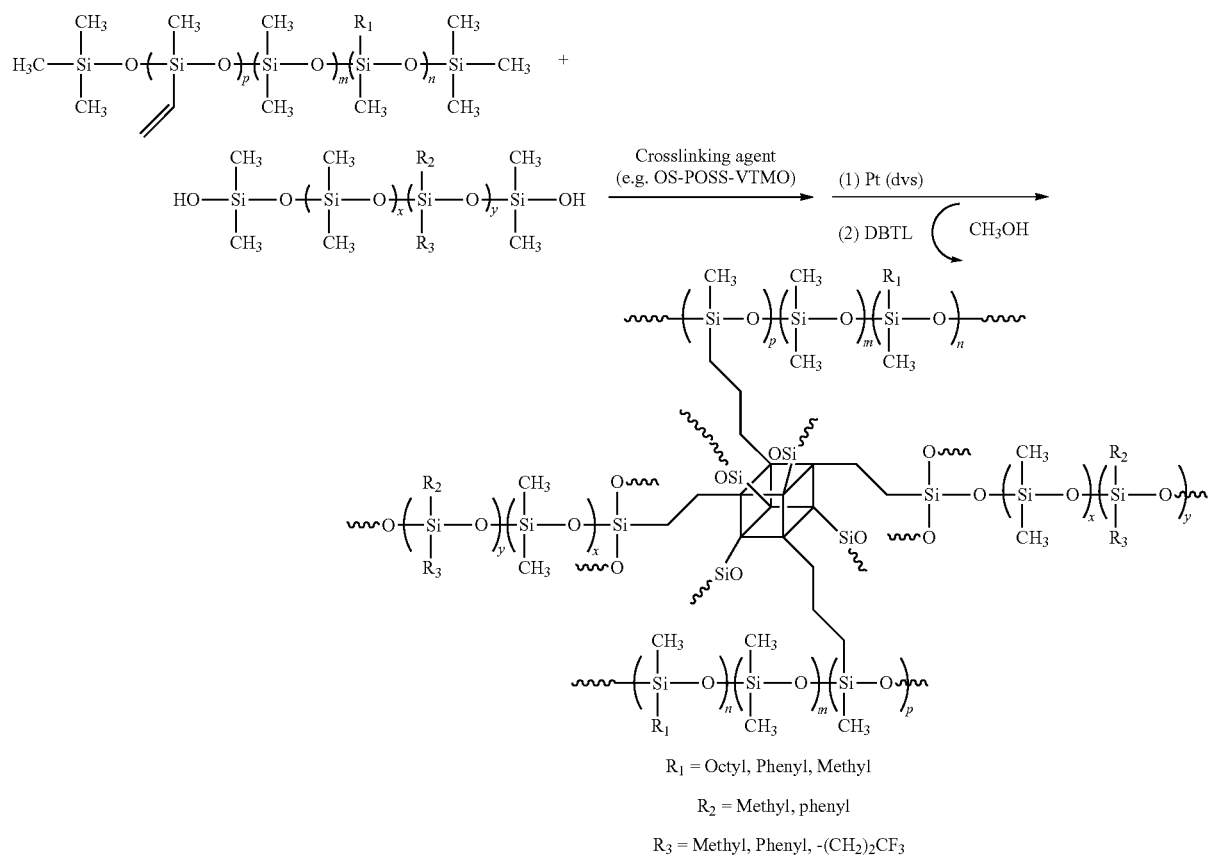

$R_1$ = Octyl, Phenyl, Methyl $R_2$ = Methyl, phenyl $R_3$ = Methyl, Phenyl, -$(CH_2)_2CF_3$ The functionalized POSS compound (OS-POSS-VTMO-1 or OS-POSS-VTMO-2) (2.5 g) was mixed with 5 g of a vinylmethylsiloxane terpolymer (3-5% vinylmethylsiloxane, 35-40% octylmethylsiloxane, dimethylsiloxane terpolymer having a molecular weight of 10,000 Da to 12,000 Da) in 20 mL chloroform at room temperature for 30 min. Then, a silanol-terminated polydimethylsiloxane (0.5 g) with a molecular weight of 2,300 Da was added to the polymer solution and mixed at room temperature at least 30 min. Then two catalysts, including Pt(dvs) (0.06 g) and DBTL (0.02 g), were added to the polymer solution, respectively. The solution was mixed at room temperature for 30 min. The obtained polymer solution was then cast via doctor blade (10-20 mils blade depth) onto a microporous polyacrylonitrile (PAN) support. The thin film composite membranes were dried slowly with a cover at 25° C. for 12 hours. They were then placed in an oven at 75° C. for 3 days to remove residual solvent and to fully crosslink the polymer, resulting in PDMS/POSS-1 and PDMS/POSS-2 (prepared from OS-POSS-VTMD-1 and OS—POSS-VTMD-2, respectively).

Example 2—Preparation of a Comparative Crosslinked PDMS Composite Membrane (PDMS-1)

As a comparative example, a conventional PDMS composite membrane (PDMS-1) was prepared using a polymer from commercial sources. RTV 615 silicone rubber compound including vinyl-terminated silicone rubber precursor RTV 615A and polymethylhydrosiloxane crosslinking agent RTV 615B was purchased from Momentive. The conventional PDMS composite membrane was prepared from a chloroform solution containing 10 wt % RTV615 silicon rubber compounds (10 g RTV 615A and 1 g RTV 615B) and 0.03 g Pt(dvs) catalyst. Then the polymer solution was cast via doctor blade (10-20 mils blade depth) onto a microporous PAN support. The thin film composite membranes were dried slowly with a cover at 25° C. for 12 hours. They were then placed in an oven at 75° C. for 3 days to remove residual solvent and to fully crosslink the polymer.

Example 3—Preparation of a Comparative Crosslinked Siloxane Composite Membrane (PDMS-2)

As a comparative example, a crosslinked siloxane composite membrane (PDMS-2) that did not include POSS filler was fabricated from a polymer solution (25 wt %) in chloroform containing 5.0 g vinylmethylsiloxane terpolymer (3-5% vinylmethylsiloxane, 35-45% octylmethylsiloxane, dimethylsiloxane having a molecular weight of 10,000 Da to 12,000 Da), 0.5 g RTV 615B crosslinking agent, and 0.06 g Pt(dvs). The polymer solution was cast via doctor blade (10-20 mils blade depth) onto a microporous PAN support. The thin film composite membranes were dried slowly with a cover at 25° C. for 12 hours. They were then placed in an oven at 75° C. for 3 days to remove residual solvent and to fully crosslink the polymer.

Example 4—Membrane Physical Properties

The density of the conventional PDMS membrane (PDMS-1), crosslinked siloxane membrane (PDMS-2), and crosslinked siloxane organic-inorganic hybrid membranes (PDMS/POSS-1 and PDMS/POSS-2) at 25° C. was measured using helium Pycometer (AccuPyc 111340) from Micrometrics. The equilibrium degree of swelling was calculated in triplicate using conventional gravimetric method by immersing square-shaped specimens (0.2-0.4 g) in toluene until equilibrium swelling was reached. The swollen samples were pat dried and weighed immediately. The swelling degree (q) of the membrane was calculated using Equation (1):

$$q = \frac{W_{wet} - W_o}{W_o} \quad (1)$$

where $W_{wet}$ is the wet weight of dense films after swelling and $W_o$ is the dry weight of dense films before swelling. The crosslinking density, v, of dense films was calculated according to the Flory-Rehner equation using data obtained from specimens toluene swelling.

The density, swelling degree, and crosslinking density of the conventional PDMS membrane (PDMS-1), crosslinked siloxane membrane (PDMS-2) and the PDMS/POSS organic-inorganic hybrid membranes (PDMS/POSS-1 and PDMS/POSS-2) are shown in Table 1. The results show that the crosslinked siloxane organic-inorganic hybrid membranes PDMS/POSS-1 and PDMS/POSS-2 exhibited high swelling resistance and high crosslinking density as compared to the conventional crosslinked PDMS and crosslinked siloxane membranes (PDMS-1 and PDMS-2, respectively).

TABLE 1

Physical properties of membrane materials

| Sample | Swelling degree, Q (%) | Crosslinking density, v×10⁻⁵ (mol/mL) | Density, g/cm³ |
|---|---|---|---|
| PDMS-1 | 3.15 ± 0.04 | 0.79 ± 0.03 | 1.048 |
| PDMS-2 | 2.00 ± 0.02 | 3.91 ± 0.17 | 0.953 |
| PDMS/POSS-1 | 1.38 ± 0.02 | 25.73 ± 1.69 | 1.063 |
| PDMS/POSS-2 | 1.59 ± 0.01 | 11.05 ± 0.52 | 1.079 |

Figure 6:
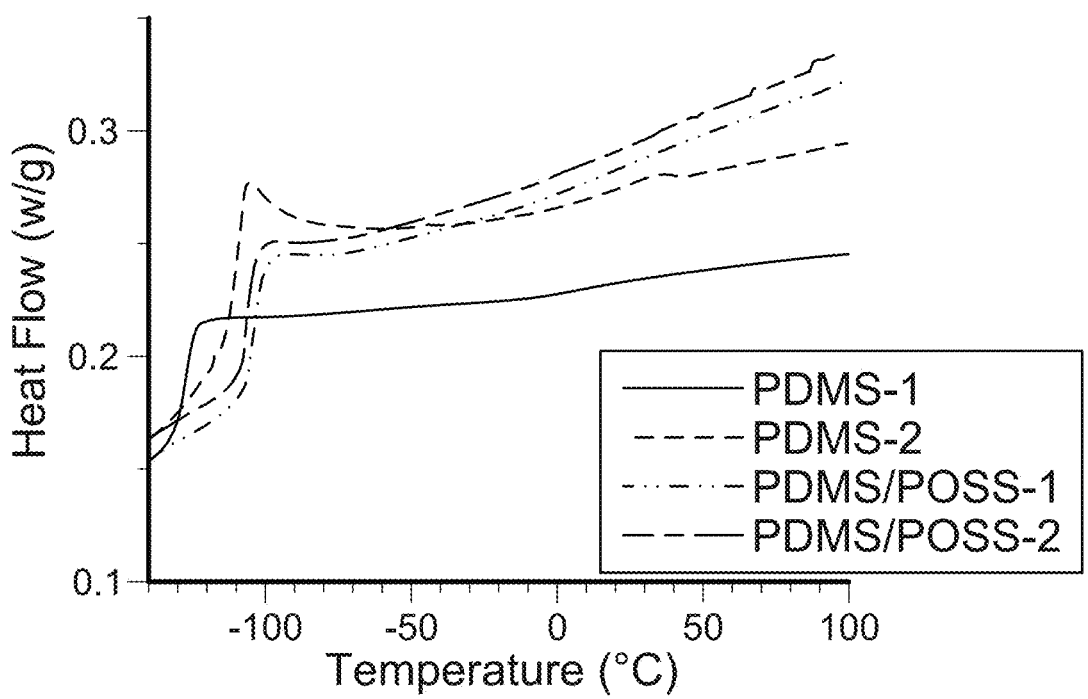
FIG. 6 shows DSC thermographs (1st heating curves) of crosslinked conventional PDMS-1, crosslinked siloxane PDMS-2 and siloxane organic-inorganic hybrid membranes (PDMS/POSS).
Figure 7:
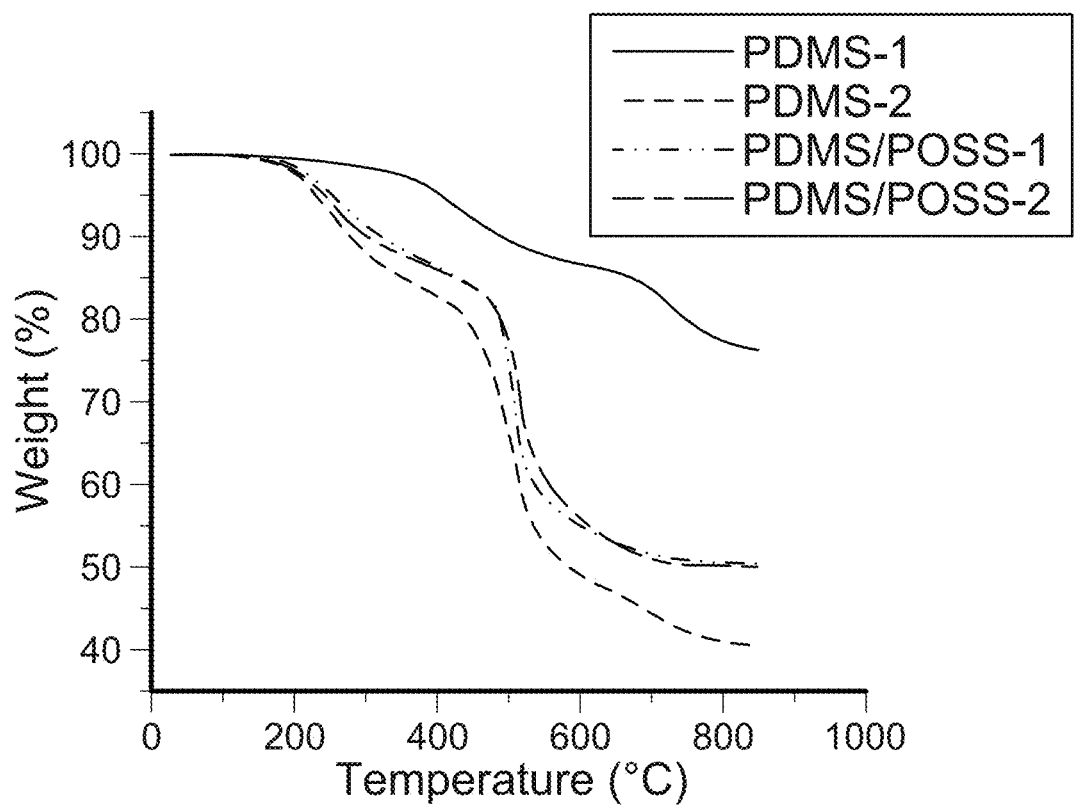
FIG. 7 shows TGA thermograms of crosslinked conventional PDMS-1, crosslinked siloxane PDMS-2 and siloxane organic-inorganic hybrid membranes (PDMS/POSS).

The thermal properties, such as glass transition temperature ($T_g$) and degradation temperature (Td) of membrane materials were characterized using Differential Scanning Calorimetry (Discovery DSC) and Thermogravimetry (Discovery TGA). Each 5-7 mg sample was scanned from −150 to 100° C. for DSC and 25 to 800° C. for TGA at a scanning rate of 10° C./min, respectively. The thermographs of the conventional crosslinked PDMS (PDMS-1), crosslinked siloxane terpolymer (PDMS-2) and the hybrid membrane materials PDMS/POSS-1 and PDMS/POSS-2 are shown in FIG. 6 and FIG. 7, and the results are summarized in Table 2.

TABLE 2

Thermal properties of membrane materials

| | Glass transition temperature, $T_g$ (° C.) | $T_{d@5\ wt\%}$ (° C.) | $T_{d@10\ wt\%}$ (° C.) |
|---|---|---|---|
| PDMS-1 | −122.90 | 406.22 | 490.88 |
| PDMS-2 | −106.13 | 232.88 | 280.55 |
| PDMS/POSS-1 | −103.69 | 257.02 | 322.52 |
| PDMS/POSS-2 | −105.82 | 245.83 | 305.33 |

As can be seen from Table 2, the crosslinked PDMS/POSS organic-inorganic hybrid membranes PDMS/POSS-1 and PDMS/POSS-2 had a higher glass transition temperature ($T_g$), compared to conventional crosslinked PDMS membrane material (PDMS-1), due to the increased local chain rigidity of siloxane terpolymers. However, the hybrid membrane materials with the $(vinylMeSiO)_p(Me_2SiO)_m(R_1MeSiO)_n$ backbone chains exhibited lower thermal stability compared to conventional PDMS membrane materials with $(Me_2SiO)_x$ backbone chains, possibly because vinylmethylsiloxane terpolymers have lower molecular weight than that of PDMS RTV 615A.

In addition, compared to crosslinked siloxane PDMS-2 membrane material (without adding POSS fillers), PDMS/POSS organic-inorganic hybrid membranes PDMS/POSS-1 and PDMS/POSS-2 showed increased glass transition temperature ($T_g$) and degradation temperature (Td), indicating that the novel dual-functional POSS crosslinking agent can improve the membrane thermal stability. The increase of $T_g$ (Table 1), swelling degree and crosslinking density (Table 2) in these PDMS/POSS organic-inorganic hybrid membranes could potentially contribute to the enhancement in membrane gas separation efficiency (selectivity).

Example 5—Membrane Permeation Testing

Figure 8:
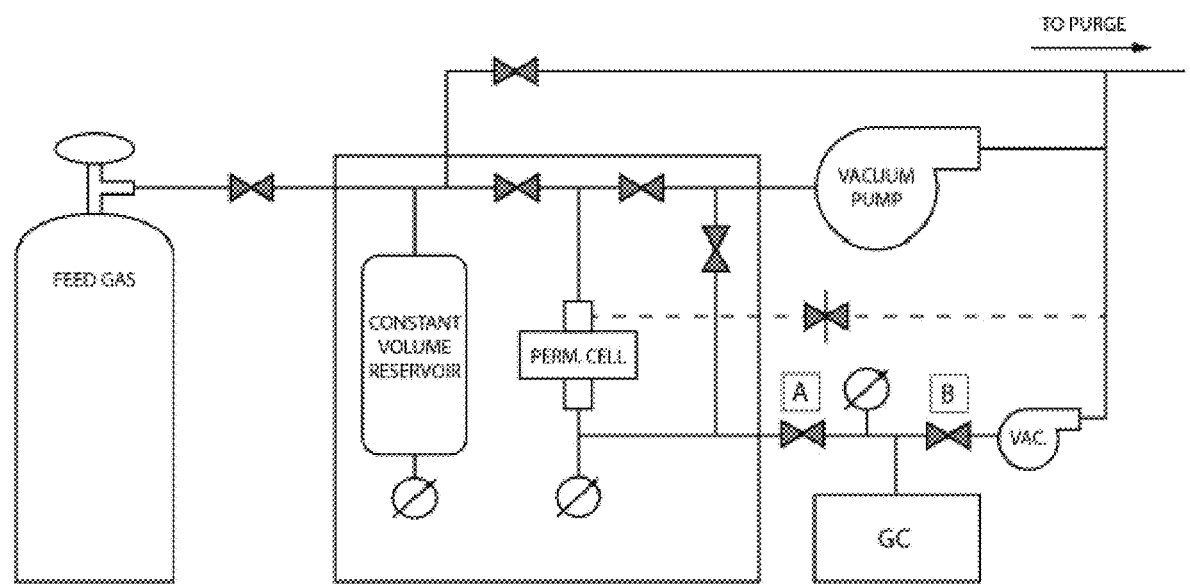
FIG. 8 is a schematic of the constant-volume permeation apparatus used for pure and mixed gas permeation testing.

Gas permeation tests were performed in triplicate using a constant-volume, variable-pressure technique. A schematic diagram of the custom-built permeation apparatus is shown in FIG. 8. A stainless steel permeation cell with 47 mm disc filters was purchased from EMD Millipore. An epoxy masked membrane sample 5-20 mm in diameter was inserted and sealed in the testing cell, and the permeation system was completely evacuated for 1 hour before each test. Pure gas permeability coefficients were measured at the temperature range of 20° C. to 50° C. and feed pressure range of 7 psi to 100 psi in the order of $N_2$, $CH_4$ followed by $CO_2$, $C_3H_8$ and $C_4H_{10}$ to avoid swelling. Steady-state permeation was verified using the time-lag method, where 10 times the diffusion time-lag was taken as the effective steady-state. The upstream (feed) pressure and the downstream (permeate) pressure were measured using Baraton absolute capacitance transducers (MKS Instruments) and recorded using LabVIEW software. The permeate pressure was maintained below 100 torr. Mixed gas permeation was performed at the temperature range of 20° C. to 50° C. and feed pressure range of 200 psi to 800 psi with a series of multicomponent gas mixtures. The gas compositions are given in Table 1. A retentate stream was added for mixed gas tests and adjusted to 100 times the permeate flow rate to maintain less than 1% stage cut. The permeate gas was collected and then injected into a Shimadzu gas chromatograph (GC-2014) to measure permeate composition. Permeate injections were performed at 95 torr. An Isco pump (TeledyneIsco) was used to control the feed pressure.

Permeability coefficients of gas i, $P_i$, was calculated according to Equation (1), where dpi/dt is the slope of the steady state pressure rise in the downstream, V is the downstream volume, R is the ideal gas constant, T is the temperature of the downstream, L is the membrane thickness (determined via JEOL 7100F scanning electron microscopy images of membrane cross sections), A is the membrane surface area (estimated using ImageJ image processing software), and $\Delta f_i$ is the partial fugacity difference across the membrane calculated using the Peng-Robinson equation. Permselectivity, $\alpha_{i/j}$, was calculated as the ratio of permeability coefficients as expressed in Equation (2).

$$P_i = \frac{dP_i}{d_t} \frac{VL}{RTA\Delta f_i} \quad (1)$$

$$\alpha_{i/j} = \frac{p_i}{p_j} \quad (2)$$

Example 6—Membrane Pure Gas Permeation Properties

The membrane pure gas permeation results at 25° C. and feed pressure of 14.5 psi are shown in Table 3. Results showed that the crosslinked PDMS/POSS organic-inorganic hybrid membranes exhibited significant improvement in separation performance (127-283% and 184-494% increase in $C_3H_8/CH_4$ and $C_4H_{10}/CH_4$ ideal selectivities, respectively), but decreased compared to the conventional crosslinking PDMS membrane (PDMS-1). In addition, the PDMS/POSS organic-inorganic hybrid membranes also demonstrated enhanced $C_{3+}/CH_4$ separation performance compared to non-POSS filled crosslinked siloxane membrane (PDMS-2) under the same testing conditions. For example, in one example, the PDMS/POSS-2 hybrid membrane had a $C_3H/CH_4$ and $C_4H_{10}/CH_4$ single gas selectivities with 12.65 and 72.26, compared to the conventional crosslinked PDMS-1 membrane with 3.30 and 12.16 and the crosslinked siloxane PDMS-2 membrane with 6.83 and 15.41, respectively.

TABLE 3

Pure gas permeation results for membranes

| Membrane | $P_{CH4}$ (Barrer) | $P_{C3H8}$ (Barrer) | $P_{C4H10}$ (Barrer) | $\alpha_{C3H8/CH4}$ | $\alpha_{C4H10/CH4}$ |
|---|---|---|---|---|---|
| PDMS-1 | 1100.83 | 3633.74 | 13389.94 | 3.30 | 12.16 |
| PDMS-2 | 428.85 | 2928.84 | 6608.87 | 6.83 | 15.41 |
| PDMS/POSS-1 | 217.03 | 1627.37 | 7479.76 | 7.48 | 34.56 |
| PDMS/POSS-2 | 257.89 | 3242.80 | 18320.89 | 12.65 | 72.26 |

Figure 9A:
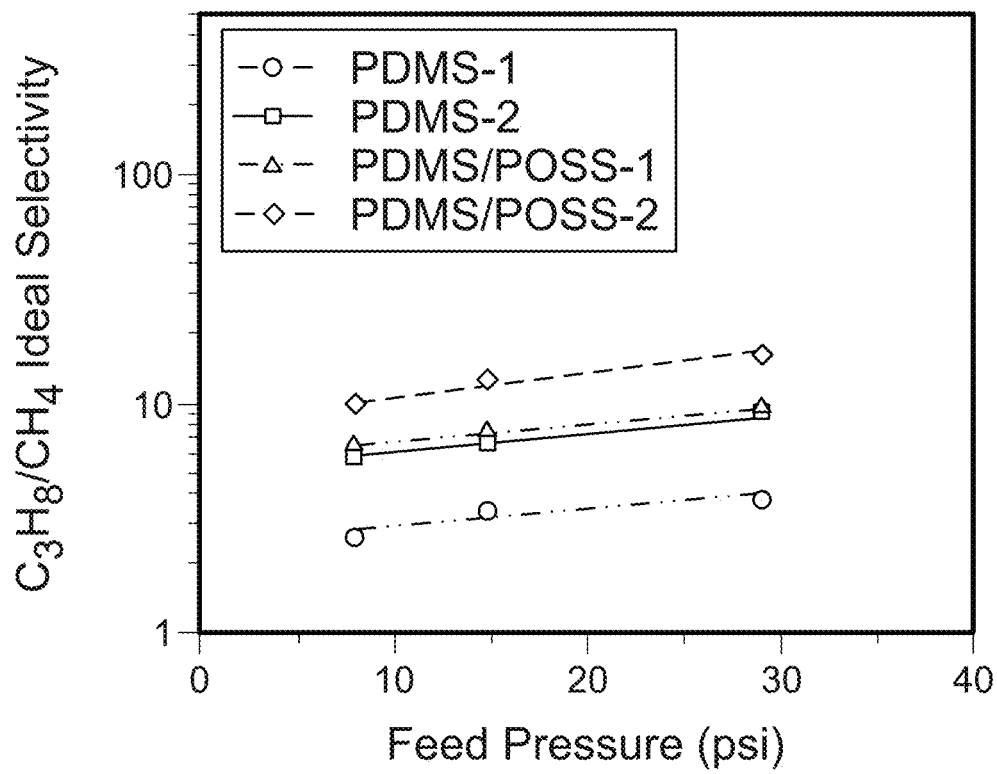
FIGS. 9A-9B show the influence of feed pressure on $C_3H_8/CH_4$ (FIG. 9A) and $C_4H_{10}/CH_4$ (FIG. 9B) ideal selectivities of conventional crosslinked PDMS-1, crosslinked siloxane PDMS-2 and the siloxane organic-inorganic hybrid membranes (PDMS/POSS).
Figure 9B:
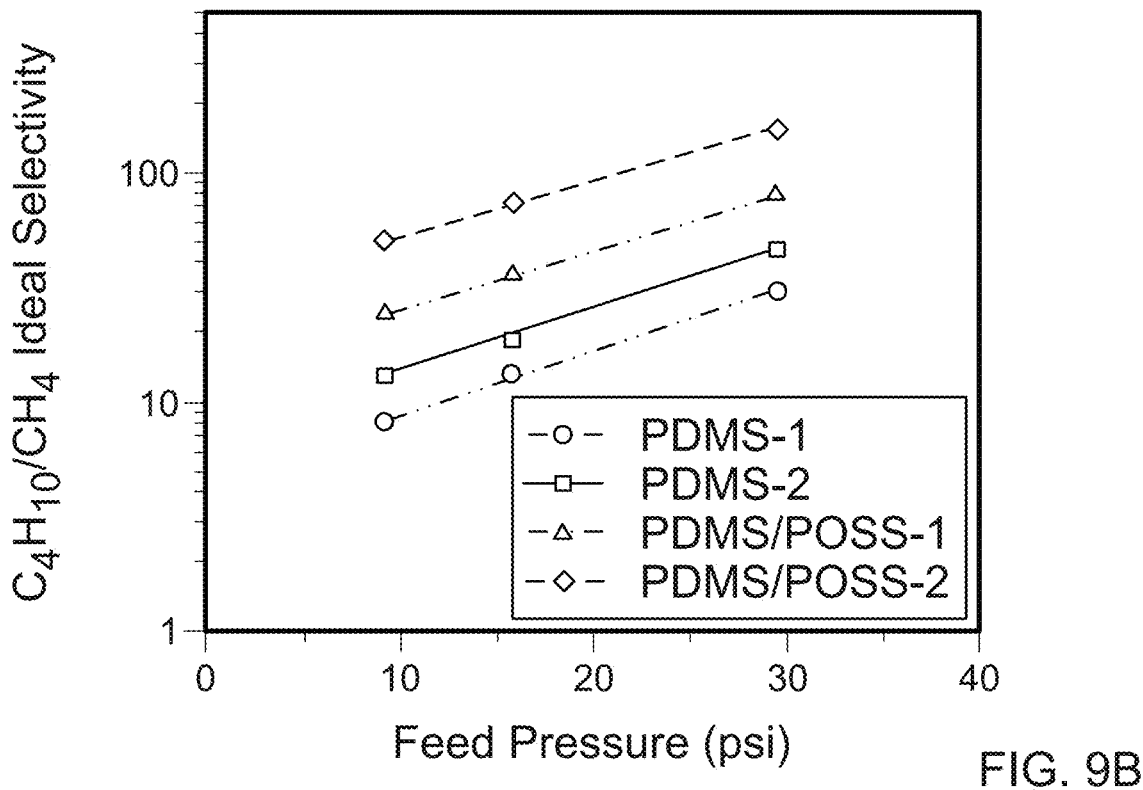

The effect of feed pressure on the membrane separation performance was investigated and the results are shown in FIGS. 9A and 9B. Results showed that the $C_{3+}/CH_4$ ideal selectivity ($C_3H_8/CH_4$ and $C_4H_{10}/CH_4$) for all membranes increased with increasing feed pressure. This improvement was attributed to the increased solubility of $C_{3+}$ hydrocarbons at high feed pressure. Under the same feed pressure, the PDMS/POSS organic-inorganic hybrid membranes (PDMS/POSS-1 and PDMS/POSS-2) showed enhanced $C_{3+}/CH_4$ ideal selectivity as compared to the PDMS-1 and PDMS-2 membranes.

Example 7—Membrane Multicomponent Gas Mixture Permeation Properties

Pure gas permeation measurements neglect coupling effects present in real gas mixtures, which is important to consider since natural gas from wells (depending on its origin) contains significant amounts of other components, such as $CO_2$, $N_2$, and heavy hydrocarbons. To evaluate the feasibility of utilizing a membrane system in a gas plant, the membranes were evaluated under more representative feed streams to simulate conditions closer to those found in a typical natural gas well. Hence, $C_{3+}$ rich multicomponent gas mixtures consisting of $C_1$-$C_5$ hydrocarbon mixtures, $CO_2$, $N_2$, and aromatic contaminants through the membranes were used to simulate real natural gas streams.

6-Component Gas Mixture Permeation Properties

The mixed gas permeation properties of conventional crosslinked PDMS (PDMS-1), crosslinked siloxane (PDMS-2), and the PDMS/POSS organic-inorganic hybrid membranes (PDMS/POSS-1 and PDMS/POSS-2) in a 6-component gas mixture (including 12% $N_2$, 12% $CO_2$, 66.5% $CH_4$, 5% $C_2H_6$, 3% $C_3H_8$ and 1.5% $C_4H_{10}$) were evaluated at feed pressure of 200 psi to 800 psi at 25° C. The membrane permeation results at 800 psi are shown in Table 4. Results showed that the PDMS/POSS organic-inorganic hybrid membranes demonstrated significant increased mixed gas selectivities of $C_{3+}/CH_4$ ($C_3H_8/CH_4$ and $C_4H_{10}/CH_4$), but decreased permeabilities of $CH_4$, $C_3H_8$ and $C_4H_{10}$ as compared to the PDMS-1 and PDMS-2 membranes. In one example, the PDMS/POSS-2 hybrid membrane had $C_3H_8/CH_4$ and $C_4H_{10}/CH_4$ mixed gas selectivities with 7.08 and 16.79, compared to the conventional crosslinked PDMS-1 membrane with 5.32 and 10.52, respectively.

TABLE 4

6-component gas mixture permeation results for membranes at feed pressure of 800 psi

| Membrane | $P_{CH4}$ (Barrer) | $P_{C3H8}$ (Barrer) | $P_{C4H10}$ (Barrer) | $C_{3H8/CH4}$ | $C_{4H10/CH4}$ |
|---|---|---|---|---|---|
| PDMS-1 | 1000.00 | 5283.04 | 10429.57 | 5.32 | 10.52 |
| PDMS-2 | 537.03 | 3816.68 | 8584.16 | 7.11 | 15.98 |
| PDMS/POSS-1 | 259.30 | 1831.20 | 4189.10 | 7.06 | 16.15 |
| PDMS/POSS-2 | 400.80 | 2838.70 | 6729.70 | 7.08 | 16.79 |

Figure 10A:
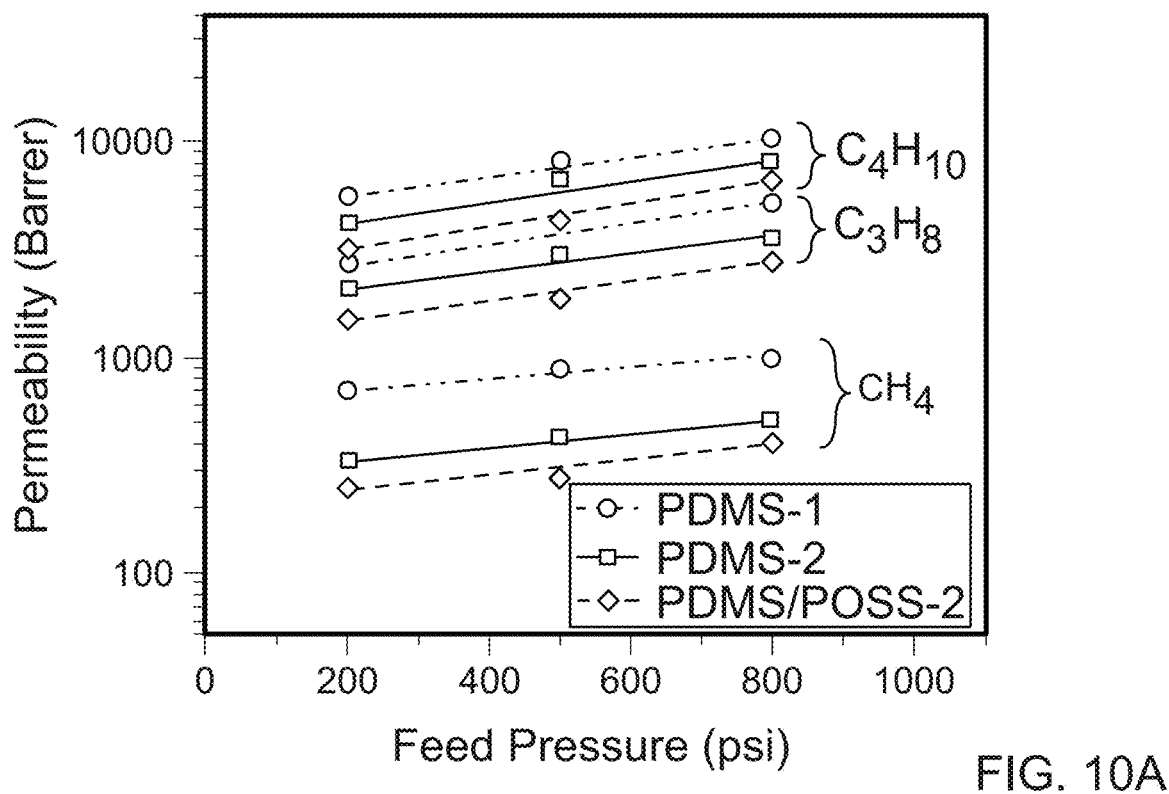
FIGS. 10A-10B show the influence of feed pressure on $CH_4$, $C_3H_8$ and $C_4H_{10}$ permeabilities (FIG. 10A) and $C_3H_8/CH_4$ and $C_4H_{10}/CH_4$ mixed gas selectivities (FIG. 10B) of conventional crosslinked PDMS-1 membrane, crosslinked siloxane PDMS-2 and a hybrid membrane (PDMS/POSS-2) in the 6-component gas mixtures (12% $N_2$, 12% $CO_2$, 66.5% $CH_4$, 5% $C_2H_6$, 3% $C_3H_8$ and 1.5% $C_4H_{10}$) at 25° C.
Figure 10B:
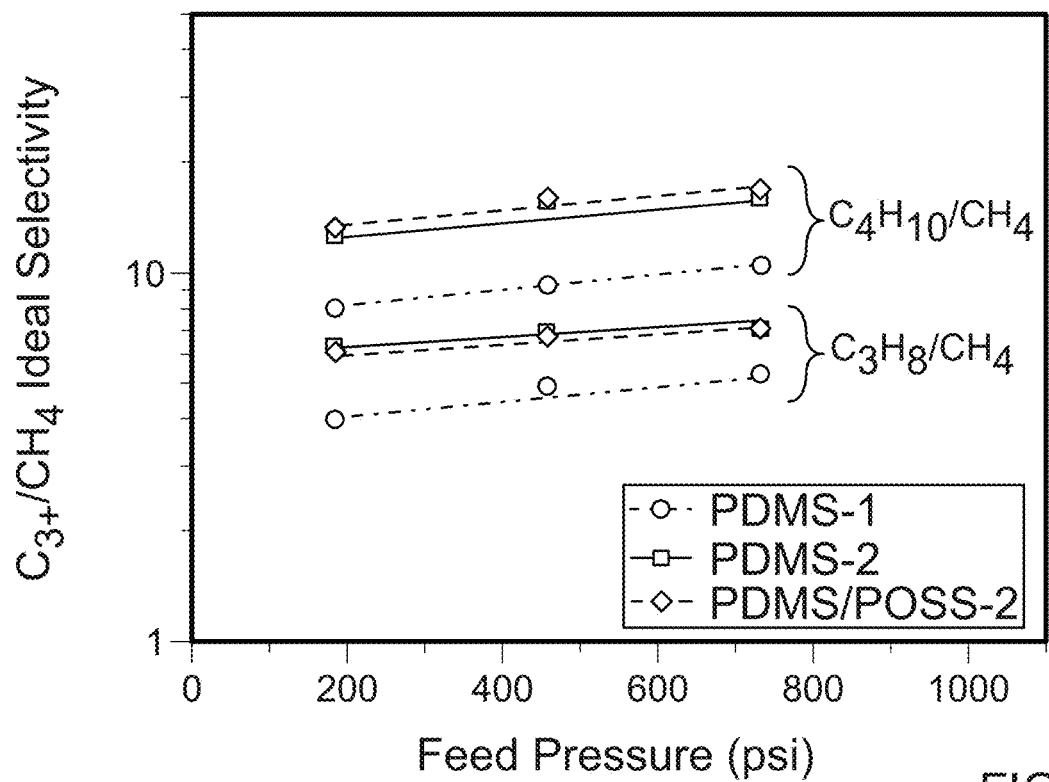

The effect of feed pressure on the membrane permeability ($CH_4$, $C_3H_8$ and $C_4H_{10}$) and mixed gas selectivity ($C_3H_8/CH_4$ and $C_4H_{10}/CH_4$) of the conventional crosslinked PDMS (PDMS-1), crosslinked siloxane (PDMS-2), and the PDMS/POSS organic-inorganic hybrid membrane (PDMS/POSS-2) is illustrated in FIGS. 10A and 10B. The same trends were observed for all membranes with increasing permeabilities of $CH_4$, $C_3H_8$ and $C_4H_{10}$ from 200 psi to 800 psi (FIG. 10A), due to the swelling of PDMS matrix at high feed pressure. However, the permeabilities of $CH_4$, $C_3H_8$ and $C_4H_{10}$ for the PDMS/POSS-2 hybrid membrane were lower than that of the conventional crosslinked PDMS membrane (PDMS-1) under the same testing conditions. In one example, at feed pressure of 800 psi, the $CH_4$, $C_3H_8$, and $C_4H_{10}$ permeabilities of the PDMS/POSS-2 hybrid membrane was 400.80, 2838.70, and 6729.70 Barrer, respectively, whereas that of the conventional crosslinked PDMS-1 membrane was about 150%, 86%, and 55% higher than that of the PDMS/POSS-2 hybrid membrane. These results indicated that the PDMS/POSS-2 hybrid membrane with enhanced swelling resistance and high crosslinking density appeared to decrease the permeability of the membrane.

The effect of feed pressure on separation performance for the conventional crosslinked PDMS (PDMS-1), crosslinked siloxane (PDMS-2) and PDMS/POSS organic-inorganic hybrid membrane (PDMS/POSS-2) is shown in FIG. 10B.

The $C_3H_8/CH_4$ and $C_4H_{10}/CH_4$ mixed gas selectivities increased by increasing feed pressure. Under the same mixed gas testing conditions, higher $C_3H_8/CH_4$ and $C_4H_{10}/CH_4$ mixed gas selectivities were achieved by the PDMS/POSS-2 hybrid membrane than that of the conventional crosslinked PDMS-1 membrane. As mentioned, swelling led to higher chain mobility of the conventional crosslinked PDMS-1 membrane as compared to the PDMS/POSS-2 hybrid membrane, which resulted in a more significant increase in permeability. This increase was much more pronounced for $CH_4$ (150%) compared to $C_3H_8$ (86%) and $C_4H_{10}$ (55%) at 800 psi. Consequently, the PDMS/POSS-2 hybrid membrane exhibited improvement in $C_3H_8/CH_4$ and $C_4H_{10}/CH_4$ mixed gas selectivities under the same feed pressure. In one example, the PDMS/POSS-2 hybrid membrane had $C_3H_8/CH_4$ and $C_4H_{10}/CH_4$ mixed gas selectivities with 7.08 and 16.79, compared to the conventional crosslinked PDMS-1 membrane with 5.32 and 10.52, respectively.

Figure 11:
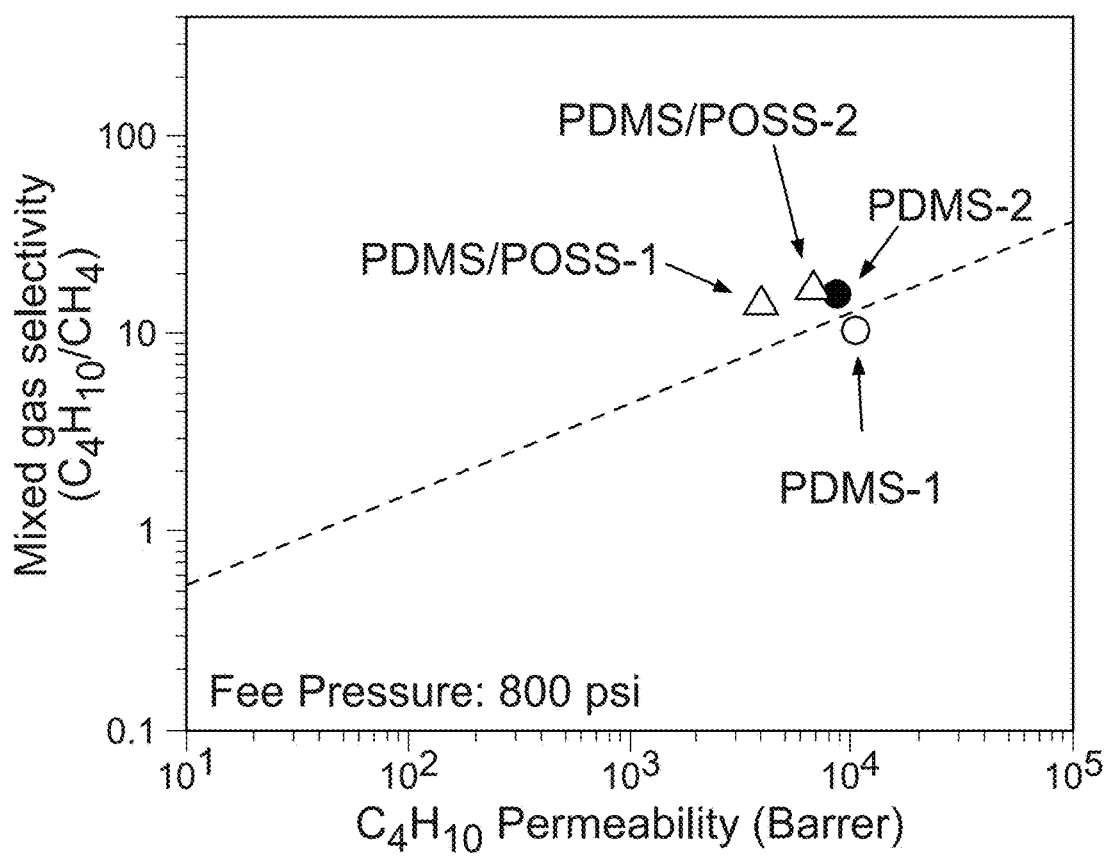
FIG. 11 is a comparison of separation performance ($C_4H_{10}/CH_4$ vs. $C_4H_{10}$) for a conventional crosslinked PDMS membrane, a crosslinked siloxane, and hybrid membranes (PDMS/POSS) in the 6-component gas mixtures (12% $N_2$, 12% $CO_2$, 66.5% $CH_4$, 5% $C_2H_6$, 3% $C_3H_8$ and 1.5% $C_4H_{10}$) at 800 psi and 25° C.

FIG. 11 shows the separation performances comparison ($C_{3+}/CH_4$ selectivity vs. $C_{3+}$ permeability) between the conventional crosslinked PDMS-1 membrane, crosslinked siloxane PDMS-2 and the crosslinked PDMS/POSS hybrid membranes (PDMS/POSS-1 and PDMS/POSS-2) at the feed pressure 800 psi and 25° C. Results showed that the PDMS/POSS organic-inorganic hybrid membranes exhibited enhanced separation performance (higher $C_4H_{10}/CH_4$ mixed gas selectivity), but decreased $C_{3+}$ permeabilities at high feed pressure (800 psi), compared to both the conventional crosslinked PDMS-1 and crosslinked siloxane PDMS-2 membranes.

7-Component Gas Mixture Permeation Properties

In real natural gas processing, aromatic hydrocarbons such as benzene, toluene, ethyl benzene, and xylene (BTEX) are present in raw natural gas feed streams at concentrations ranging from 200 ppm to 5000 ppm, dependent on the natural gas source. It has been demonstrated that the presence of BTEX in the gas feed streams during gas processing can alter the gas separation performance of polymeric membranes. In order to further assess the real performance of the hybrid membranes, a 7-component gas mixture containing 14% $N_2$, 78% $CH_4$, 5% $C_2H_6$, 2% $C_3H_8$, 0.5% $C_4H_{10}$, 0.5% $C_5H_{12}$, and 500 ppm toluene was tailored to replicate a realistic natural gas well, and results are shown in Table 5.

TABLE 5

7-component mixture permeation results for membranes

| Membrane # | $P_{CH4}$ (Barrer) | $P_{C3H8}$ (Barrer) | $P_{C4H10}$ (Barrer) | $\alpha_{C3H8/CH4}$ | $\alpha_{C4H10/CH4}$ |
|---|---|---|---|---|---|
| PDMS-1 | 801.85 | 3308.15 | 5730.45 | 4.10 | 7.09 |
| PDMS-2 | 474.50 | 2683.00 | 5322.40 | 5.65 | 11.22 |
| PDMS/POSS-2 | 261.50 | 2025.30 | 4881.20 | 7.74 | 18.67 |

Results showed that the PDMS/POSS-2 organic-inorganic hybrid membrane showed significant increased mixed gas selectivities of $C_{3+}/CH_4$ ($C_3H_8/CH_4$ and $C_4H_{10}/CH_4$) compared to the conventional crosslinked PDMS-1 membrane and crosslinked siloxane PDMS-2 membrane. For example, at feed pressure of 800 psi, the PDMS/POSS-2 organic-inorganic hybrid membrane had $C_3H/CH_4$ and $C_4H_{10}/CH_4$ mixed gas selectivities with 7.74 and 18.67, while conventional crosslinked PDMS-1 membrane had $C_3H_8/CH_4$ and $C_4H_{10}/CH_4$ mixed gas selectivities with 4.10 and 7.09, and crosslinked siloxane PDMS-2 with 5.65 and 11.22, respectively. On the other hand, the permeability ($CH_4$, $C_3H_8$ and $C_4H_{10}$) for the PDMS/POSS-2 organic-inorganic hybrid membrane was lower than that of the conventional crosslinked PDMS-1 membrane and the crosslinked siloxane PDMS-2 membrane, due to the reduction of PDMS chain mobility with incorporation of the POSS filler in the membrane matrix.

Figure 12:
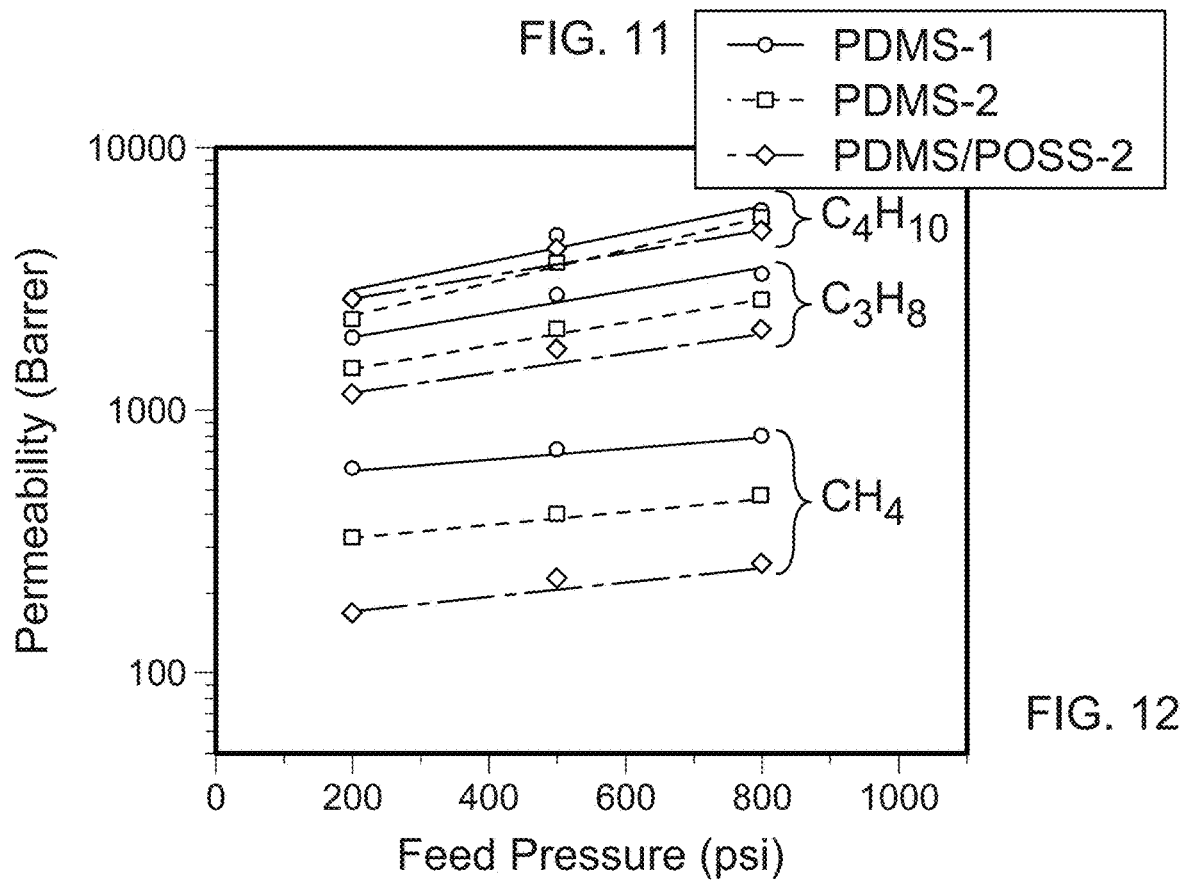
FIG. 12 shows the influence of feed pressure on $C_4H_{10}$, $C_3H_8$ and $CH_4$ permeabilities for conventional crosslinked PDMS-1, crosslinked siloxane PDMS-2, and crosslinked siloxane PDMS/POSS-2 hybrid membranes in a 7-component gas mixture (14% $N_2$, 78% $CH_4$, 5% $C_2H_6$, 2% $C_3H_8$, 0.5% $C_4H_{10}$, 0.5% $C_5H_{12}$, 500 ppm toluene) at 25° C.
Figure 13A:
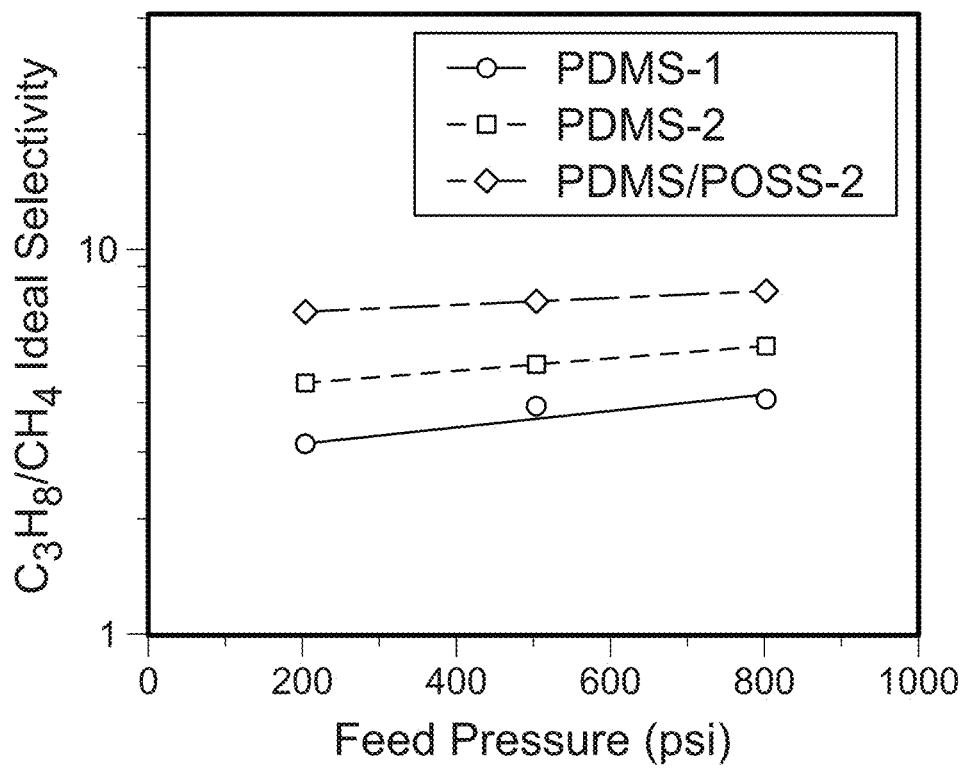
FIGS. 13A-13B show the influence of feed pressure on $C_3H_8/CH_4$ (FIG. 13A) and $C_4H_{10}/CH_4$ (FIG. 13B) mixed gas selectivities of the PDMS-1 membrane, PDMS-2 membrane and PDMS/POSS-2 hybrid membrane in a 7-component gas mixture (14% $N_2$, 78% $CH_4$, 5% $C_2H_6$, 2% $C_3H_8$, 0.5% $C_4H_{10}$, 0.5% $C_5H_{12}$, 500 ppm toluene) at 25° C.
Figure 13B:
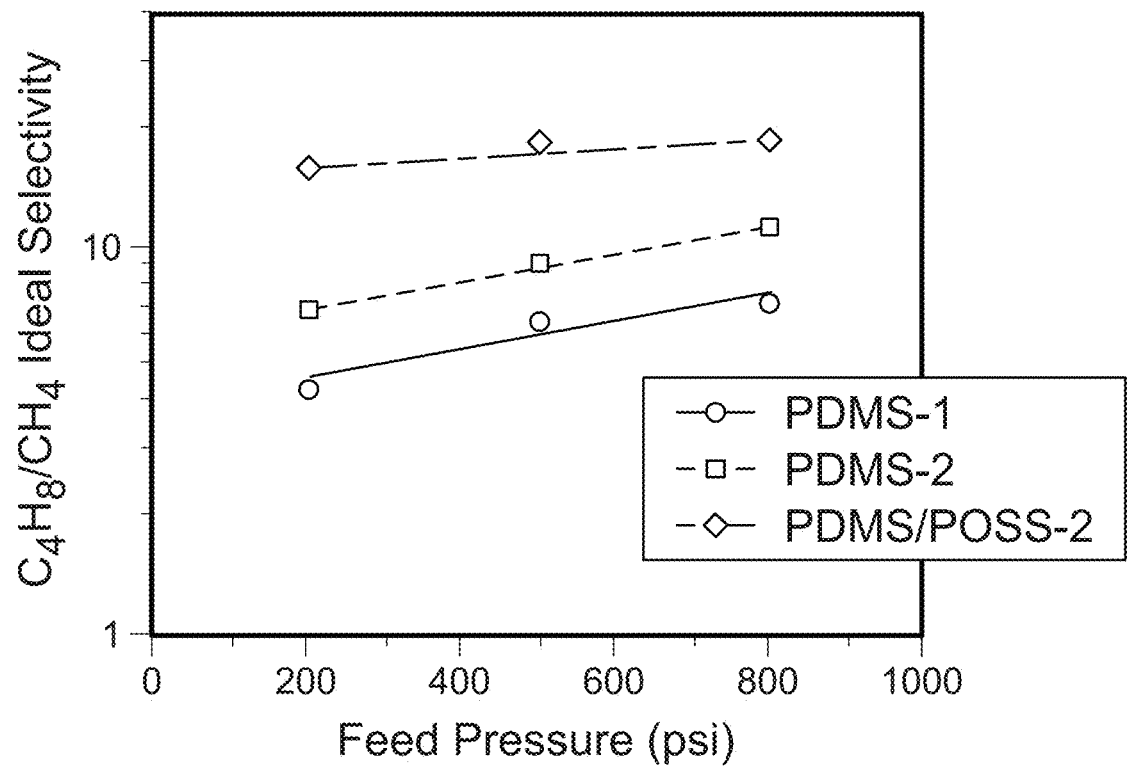

The effect of feed pressure on permeation and separation performance for the PDMS/POSS-2 organic-inorganic hybrid membrane, conventional crosslinked PDMS-1 and crosslinked siloxane PDMS-2 membranes in the 7-component gas mixture is shown in FIG. 12 and FIGS. 13A and 13B. Mixed gas selectivities for $CH_4$, $C_3H_8$ and $C_4H_{10}$ showed the same trends as in the 6-component gas measurement, and increased with increasing feed pressure (FIG. 12). Similarly, the permeabilities of $CH_4$, $C_3H_8$ and $C_4H_{10}$ for the PDMS/POSS-2 hybrid membrane were lower than that of the conventional crosslinked PDMS (PDMS-1) membrane under the same feed pressure. In one example, at feed pressure of 800 psi, the $CH_4$, $C_3H_8$, and $C_4H_{10}$ permeabilities of the PDMS/POSS-2 hybrid membrane were 261.5, 2025.3, and 4881.2 Barrer, respectively, whereas that of the conventional crosslinked PDMS-1 membrane were about 207%, 63%, and 17% higher than that of the PDMS/POSS-2 hybrid membrane. In addition, the crosslinked siloxane PDMS-2 membrane without incorporation of the POSS filler had 81%, 32% and 9% increase in $CH_4$, $C_3H_8$, and $C_4H_{10}$ permeabilities compared to the PDMS/POSS-2 hybrid membrane under the same testing conditions (feed pressure of 800 psi).

The $C_3H_8/CH_4$ and $C_4H_{10}/CH_4$ mixed gas selectivities for the conventional crosslinked PDMS-1, crosslinked siloxane PDMS-2 and crosslinked PDMS/POSS-2 organic-inorganic hybrid membranes increased by increasing feed pressure (FIGS. 13A and 13B). Under the same mixed gas testing conditions, higher $C_3H_8/CH_4$ and $C_4H_{10}/CH_4$ mixed gas selectivities were achieved by the PDMS/POSS-2 hybrid membrane than that of the conventional crosslinked PDMS-1 membrane. For example, the crosslinked PDMS/POSS-2 organic-inorganic hybrid membrane had $C_3H/CH_4$ and $C_4H_{10}/CH_4$ mixed gas selectivities with 7.74 and 18.67, compared to the conventional crosslinked PDMS-1 membrane with 4.10 and 7.09 at 800 psi and 25° C., respectively.

Figure 14A:
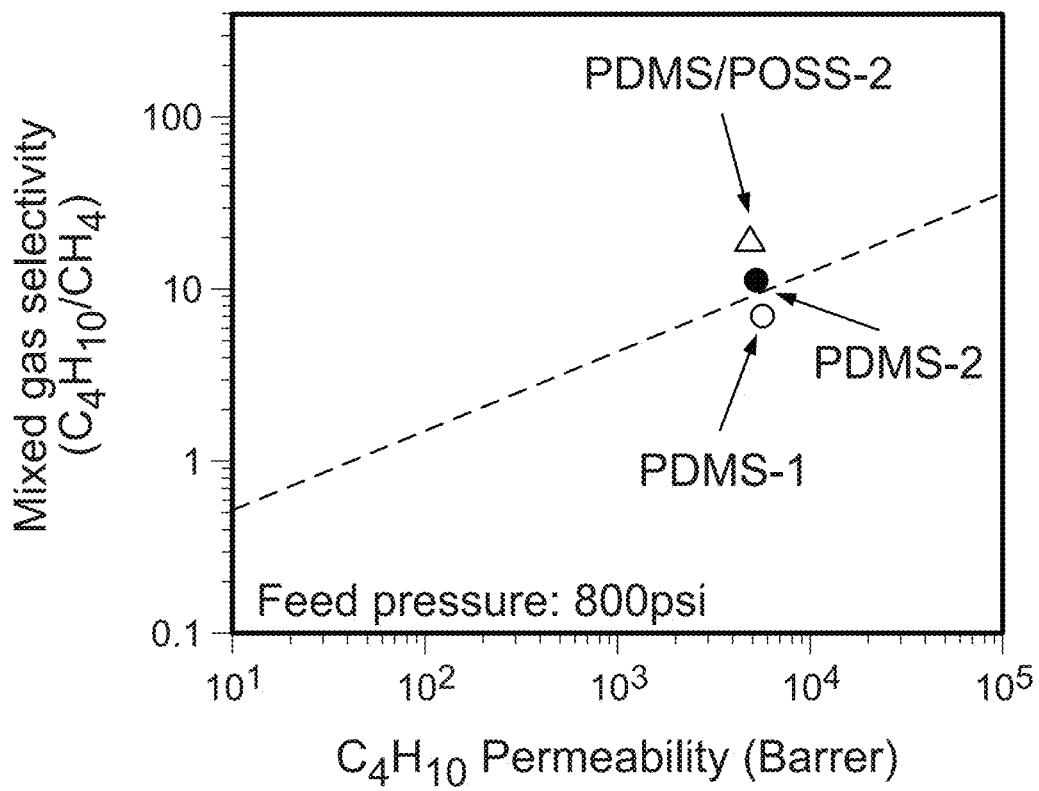
FIGS. 14A-14B are a comparison of separation performance for $C_4H_{10}/CH_4$ vs. $C_4H_{10}$ (FIG. 14A) and $C_3H_8/CH_4$ vs. $C_3H_8$ (FIG. 14B) for conventional crosslinked PDMS membrane (PDMS-1), crosslinked siloxane (PDMS-2), and crosslinked siloxane organic-inorganic hybrid membrane (PDMS/POSS-2) in the 7-component gas mixtures (14% $N_2$, 78% $CH_4$, 5% $C_2H_6$, 2% $C_3H_8$, 0.5% $C_4H_{10}$, 0.5% $C_5H_{12}$, 500 ppm toluene) at 800 psi and 25° C.
Figure 14B:
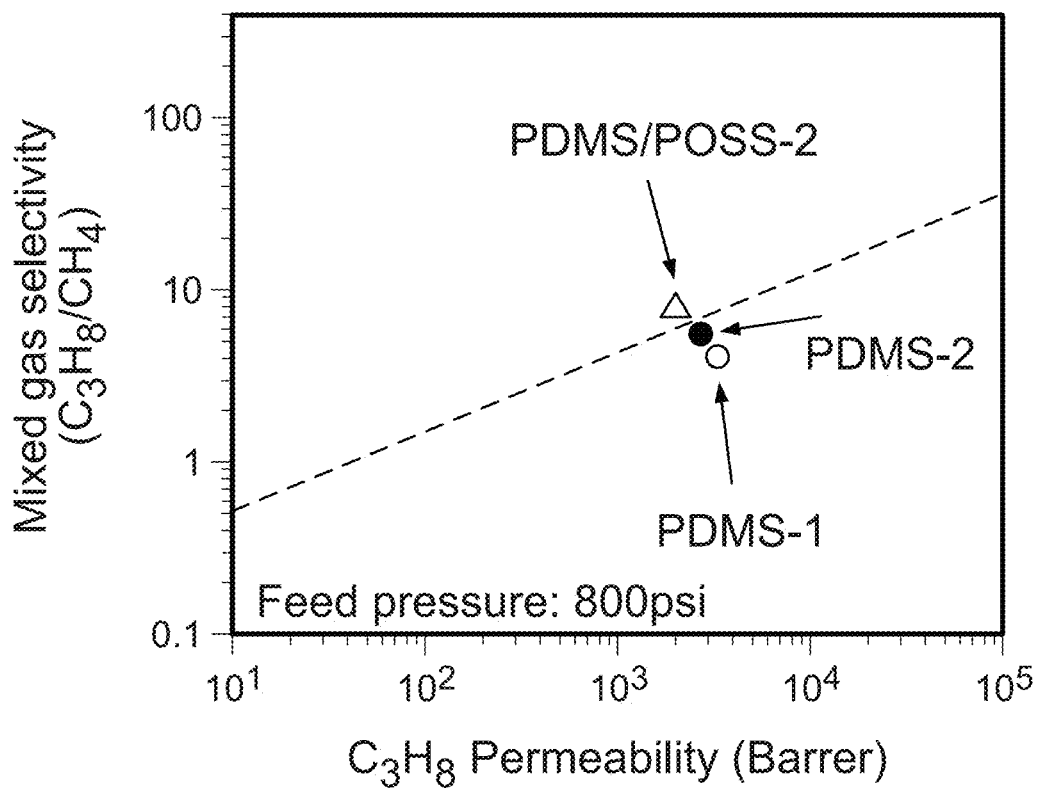

FIGS. 14A and 14B show the separation performances comparison ($C_{3+}/CH_4$ selectivity vs. $C_{3+}$ permeability) between the conventional crosslinked PDMS-1 membrane, crosslinked siloxane PDMS-2, and crosslinked PDMS/POSS-2 organic-inorganic hybrid membranes at the feed pressure 800 psi and 25° C. These results indicated that the crosslinked PDMS/POSS-2 organic-inorganic hybrid membrane displayed enhanced membrane separation performance under field relevant feed stream compositions and testing conditions, which can be beneficial for an enhanced recovery of $C_{3+}$ hydrocarbons from natural gas.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A compound of Formula (I):

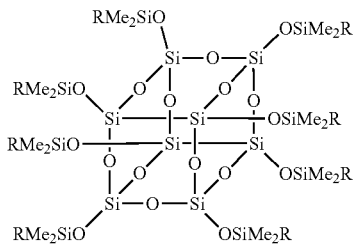

wherein:
  each R is independently selected from H and —($C_2$-$C_{11}$ alkyl)-Si—(O—($C_1$-$C_3$ alkyl))$_3$; and
  the compound of Formula (I) comprises a ratio of H to —($C_2$-$C_{11}$ alkyl)-Si—(O—($C_1$-$C_3$ alkyl))$_3$ of 1:3, 1:1, or 3:1.

2. The compound of claim 1, wherein —($C_2$-$C_{11}$ alkyl)-Si—(O—($C_1$-$C_3$ alkyl))$_3$ is —(CH$_2$)$_2$—Si—(O—(CH$_3$))$_3$.

3. The compound of claim 2, wherein the ratio of H to —(CH$_2$)$_2$—Si—(O—(CH$_3$))$_3$ is 3:1.

4. The compound of claim 1, having the structure:

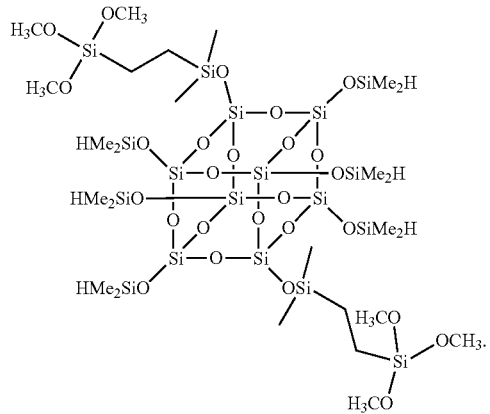

5. An organic-inorganic hybrid membrane comprising:
a compound of Formula (I):

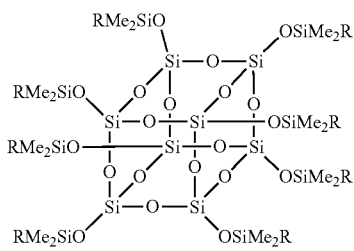

wherein each R is independently selected from H and —($C_2$-$C_{11}$ alkyl)-Si—(O—($C_1$-$C_3$ alkyl))$_3$, and wherein the compound of Formula (I) comprises a ratio of H to —($C_2$-$C_{11}$ alkyl)-Si—(O—($C_1$-$C_3$ alkyl))$_3$ of 1:3, 1:1, or 3:1;
vinylmethylsiloxane terpolymers; and
silanol functional polymer;
wherein the compound of Formula (I), the vinylmethylsiloxane terpolymers, and the silanol functional polydimethylsiloxane are crosslinked.

6. The membrane of claim 5, wherein the membrane is cast on a polyacrylonitrile (PAN) support.

7. The membrane of claim 5, wherein —($C_2$-$C_{11}$ alkyl)-Si—(O—($C_1$-$C_3$ alkyl))$_3$ is —(CH$_2$)$_2$—Si—(O—(CH$_3$))$_3$.

8. The membrane of claim 7, wherein the ratio of H to —(CH$_2$)$_2$—Si—(O—(CH$_3$))$_3$ is 3:1.

9. The membrane of claim 5, wherein the compound of Formula (I) is a compound having the structure:

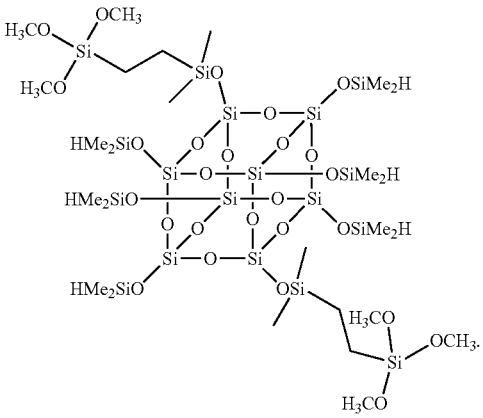

10. The membrane of claim 5, wherein the vinylsiloxane terpolymer is selected from a vinylmethylsiloxane-octylmethylsiloxane-dimethylsiloxane terpolymer and a vinylmethylsiloxane-phenylmethylsiloxane-dimethylsiloxane terpolymer.

11. The membrane of claim 10, wherein the vinylsiloxane terpolymer is a vinylmethylsiloxane-octylmethylsiloxane-dimethylsiloxane terpolymer, having a (VinylMeSiO)$_p$(Me$_2$SiO)$_m$(R$_1$MeSiO)$_n$ backbone.

12. The membrane of claim 11, wherein the vinylmethylsiloxane-octylmethylsiloxane-dimethylsiloxane terpolymer contains about 1% to about 5% vinylmethylsiloxane and about 20% to about 40% octylmethylsiloxane.

13. The membrane of claim 10, wherein the vinylsiloxane terpolymer is a vinylmethylsiloxane-phenylmethylsiloxane-dimethylsiloxane terpolymer, having a (VinylMeSiO)$_p$(PhMeSiO)$_m$(R$_1$MeSiO)$_n$ backbone.

14. The membrane of claim 13, wherein the vinylmethylsiloxane-phenylmethylsiloxane-dimethylsiloxane terpolymer contains about 1% to about 5% vinylmethylsiloxane and about 20% to about 40% phenylmethylsiloxane.

15. The membrane of claim 10, wherein the vinylsiloxane terpolymer has a molecular weight of about 2,500 Da to about 3,000 Da or about 10,000 Da to about 12,000 Da or about 50,000 Da.

16. The membrane of claim 5, wherein the silanol functional polymer is a silanol functional polydimethylsiloxane.

17. The membrane of claim 16, wherein the silanol functional polymer is a silanol functional polymer having a OH(Me$_2$SiO)$_x$(R$_2$R$_1$SiO)$_y$OH backbone.

18. The membrane of claim 5, wherein the silanol functional polymer is selected from silanol-terminated polydimethylsiloxane, silanol-terminated polydiphenylsiloxane, silanol-terminated diphenylsiloxane-dimethylsiloxane copolymer containing diphenylsiloxane monomers, silanol-terminated polytrifluoropropylmethylsiloxane, and combinations thereof.

19. The membrane of claim 5, wherein the silanol functional polymer has a molecular weight of about 550 Da to about 1,200 Da or about 1,000 Da to about 1,400 Da or about 900 Da to about 50,000 Da or about 400 Da to about 140,000 Da.

20. The membrane of claim 5, wherein the membrane has a crosslinking density of about $10 \times 10^{-5}$ mol/mL to about $30 \times 10^{-5}$ mol/mL.

21. The membrane of claim 5, wherein the membrane has a $C_3H_8/CH_4$ single gas selectivities ($\alpha C_3H_8/CH_4$) of about 7 to about 25 at feed temperature of 25° C. and feed pressure of 1 bar.

22. The membrane of claim 5, wherein the membrane has a $C_4H_{10}/CH_4$ single gas selectivities ($\alpha C_4H_{10}/CH_4$) of about 25 to about 100 at feed temperature of 25° C. and feed pressure of 1 bar.

23. A method of separating $C_{3+}$ hydrocarbons from natural gas, comprising:

providing an organic-inorganic hybrid membrane comprising:

a compound of Formula (I):

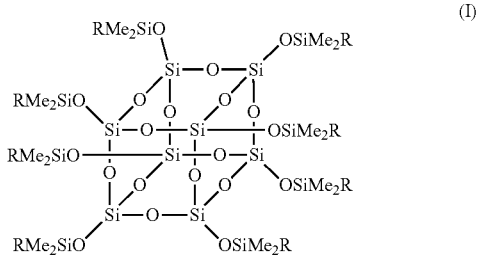

wherein each R is independently selected from H and —($C_2$-$C_{11}$ alkyl)-Si—(O—($C_1$-$C_3$ alkyl))$_3$, and wherein the compound of Formula (I) comprises a ratio of H to —($C_2$-$C_{11}$ alkyl)-Si—(O—($C_1$-$C_3$ alkyl))$_3$ of 1:3, 1:1, or 3:1;

vinylmethylsiloxane terpolymers; and silanol functional polymer;

wherein the compound of Formula (I), the vinylmethylsiloxane terpolymers, and the silanol functional polydimethylsiloxane are crosslinked;

introducing a natural gas stream to the membrane; and separating the $C_{3+}$ hydrocarbons from the natural gas.

24. The method of claim 23, wherein the compound of Formula (I) is a compound having the structure:

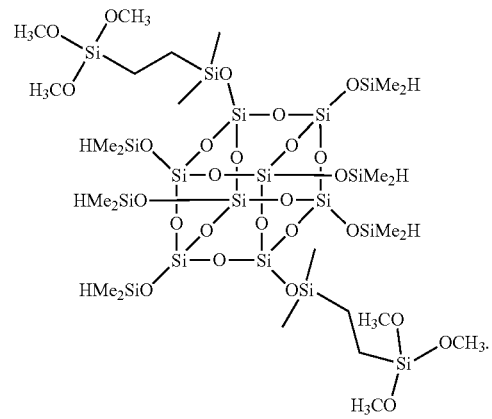

25. The method of claim 23, wherein the vinylsiloxane terpolymer is selected from a vinylmethylsiloxane-octylmethylsiloxane-dimethylsiloxane terpolymer and a vinylmethylsiloxane-phenylmethylsiloxane-dimethylsiloxane terpolymer.

26. The method of claim 25, wherein the vinylsiloxane terpolymer is a vinylmethylsiloxane-octylmethylsiloxane-dimethylsiloxane terpolymer having a $(VinylMeSiO)_p(Me_2SiO)_m(R_1MeSiO)_n$ backbone.

27. The method of claim 26, wherein the vinylmethylsiloxane-octylmethylsiloxane-dimethylsiloxane terpolymer contains about 1% to about 5% vinylmethylsiloxane and about 20% to about 40% octylmethylsiloxane.

28. The membrane of claim 25, wherein the vinylsiloxane terpolymer is a vinylmethylsiloxane-phenylmethylsiloxane-dimethylsiloxane terpolymer, having a $(VinylMeSiO)_p(PhMeSiO)_m(R_1MeSiO)_n$ backbone.

29. The membrane of claim 28, wherein the vinylmethylsiloxane-phenylmethylsiloxane-dimethylsiloxane terpolymer contains about 1% to about 5% vinylmethylsiloxane and about 20% to about 40% phenylmethylsiloxane.

30. The method of claim 25, wherein the vinylsiloxane terpolymer has a molecular weight of about 2,500 Da to about 3,000 Da or about 10,000 Da to about 12,000 Da or about 50,000 Da.

31. The method of claim 23, wherein the silanol functional polymer is a silanol functional polydimethylsiloxane.

32. The method of claim 31, wherein the silanol functional polymer is a silanol functional polymer having a $OH(Me_2SiO)_x(R_2R_1SiO)_yOH$ backbone.

33. The method of claim 23, wherein the silanol functional polymer is selected from silanol-terminated polydimethylsiloxane, silanol-terminated polydiphenylsiloxane, silanol-terminated diphenylsiloxane-dimethylsiloxane copolymer containing diphenylsiloxane monomers, silanol-terminated polytrifluoropropylmethylsiloxane, and combinations thereof.

34. The method of claim 23, wherein the silanol functional polymer has a molecular weight of about 550 Da to about 1,200 Da or about 1,000 Da to about 1,400 Da or about 900 Da to about 50,000 Da or about 400 Da to about 140,000 Da.

35. The method of claim 23, wherein the membrane has a crosslinking density of about $10 \times 10^{-5}$ mol/mL to about $30 \times 10^{-5}$ mol/mL.

36. The method of claim 23, wherein the $C^{3+}$ hydrocarbons are more permeable through the membrane than methane.

* * * * *

UNITED STATES PATENT AND TRADEMARK OFFICE
CERTIFICATE OF CORRECTION

PATENT NO. : 11,667,755 B2
APPLICATION NO. : 17/140378
DATED : June 6, 2023
INVENTOR(S) : Junyan Yang and Benjamin James Sundell It is certified that error appears in the above-identified patent and that said Letters Patent is hereby corrected as shown below:

In the Claims

In Column 32, Line 32, Claim 28, please replace "membrane" with -- method --.

In Column 32, Line 36, Claim 29, please replace "membrane" with -- method --.

Signed and Sealed this
Twenty-third Day of January, 2024

Katherine Kelly Vidal
*Director of the United States Patent and Trademark Office*